(12) United States Patent
Fiorentini et al.

(10) Patent No.: US 9,127,932 B2
(45) Date of Patent: Sep. 8, 2015

(54) METHOD AND APPARATUS FOR MEASURING THE THICKNESS OF A TRANSPARENT OBJECT IN AN AUTOMATIC PRODUCTION LINE

(75) Inventors: Lorenzo Paolo Dante Fiorentini, Pisa (IT); Andrea Bandera, Remedello Sopra (IT); Andrea Pasquali, Brescia (IT)

(73) Assignee: GERRESHEIMER PISA S.P.A., Pisa (IT)

( * ) Notice: Subject to any disclaimer, the term of this patent is extended or adjusted under 35 U.S.C. 154(b) by 128 days.

(21) Appl. No.: 14/001,879

(22) PCT Filed: Feb. 28, 2012
(Under 37 CFR 1.47)

(86) PCT No.: PCT/IB2012/050933
§ 371 (c)(1),
(2), (4) Date: Mar. 5, 2014

(87) PCT Pub. No.: WO2012/117353
PCT Pub. Date: Sep. 7, 2012

(65) Prior Publication Data
US 2015/0204654 A1 Jul. 23, 2015

(30) Foreign Application Priority Data
Feb. 28, 2011 (IT) .................. PI2011A0020

(51) Int. Cl.
G01B 11/28 (2006.01)
G01N 21/00 (2006.01)
G01B 11/06 (2006.01)
(52) U.S. Cl.
CPC .................. *G01B 11/06* (2013.01)
(58) Field of Classification Search
CPC ...................................... G01B 11/06
USPC .............. 356/630, 239.4, 240.1; 250/559.27, 250/559.28
See application file for complete search history.

(56) References Cited

U.S. PATENT DOCUMENTS

| 3,307,446 A | 3/1967 | Rottmann |
| 4,822,171 A | 4/1989 | Brand et al. |
| 6,806,459 B1 * | 10/2004 | Ringlien et al. .......... 250/223 B |
| 2006/0098206 A1 | 5/2006 | Kim et al. |
| 2007/0242279 A1 | 10/2007 | Michelt et al. |

FOREIGN PATENT DOCUMENTS

| DE | 1218169 B | 6/1966 |
| JP | 2007198771 A | 8/2007 |

OTHER PUBLICATIONS

International Search Report mailed Sep. 25, 2012, corresponding to International Application No. PCT/IB2012/050933.

* cited by examiner

*Primary Examiner* — Michael A Lyons
*Assistant Examiner* — Hina F Ayub
(74) *Attorney, Agent, or Firm* — Ladas & Parry LLP

(57) ABSTRACT

An apparatus (100) and a method for measuring the thickness (s) for a wall (35) of a transparent object (30); the wall (35) comprises a transparent material (35a) arranged between a proximal interface (31), set between an environment (33) and the transparent material (35a), and a distal interface (32), set between said transparent material (35a) and the environment (33). The apparatus (100) comprises a source (1) of a starting light radiation (2) and a means for focusing it (10), in order to obtain an entering light radiation (5) directed towards the wall (35) that hits the proximal interface (31) of the wall (35) of the object and is in part reflected, in order to generate a first reflected radiation (6). A part of the entering light radiation (5) that is transmitted (7), through the transparent material (35a), hitting upon the distal interface (32), is in turn reflected (8) and crosses in an opposite direction the transparent material (35a) through the proximal interface (31), in order to generate a second reflected radiation (9). A collected radiation (15) given by overlapping the first (6) and second (9) reflected radiations have a difference of intensity that is configured to obtain an interference, which allows determining the thickness (s) of the wall (35). In particular, the means for focusing comprises a lens means (10) that have two main meridians (10a, 10b) orthogonal to each other, such that the entering light radiation (5) is focused on a first virtual focus ($F_1$) in the first meridian plane (10a), and on a second virtual focus ($F_2$) in the second meridian plane (10b). This way, it is obtained that the collected radiation (15) is substantially independent from possible movements of the transparent object (30), and this allows a remarkable reliability and robustness of the measurement with respect to fluctuations and vibrations of the object (30).

10 Claims, 16 Drawing Sheets

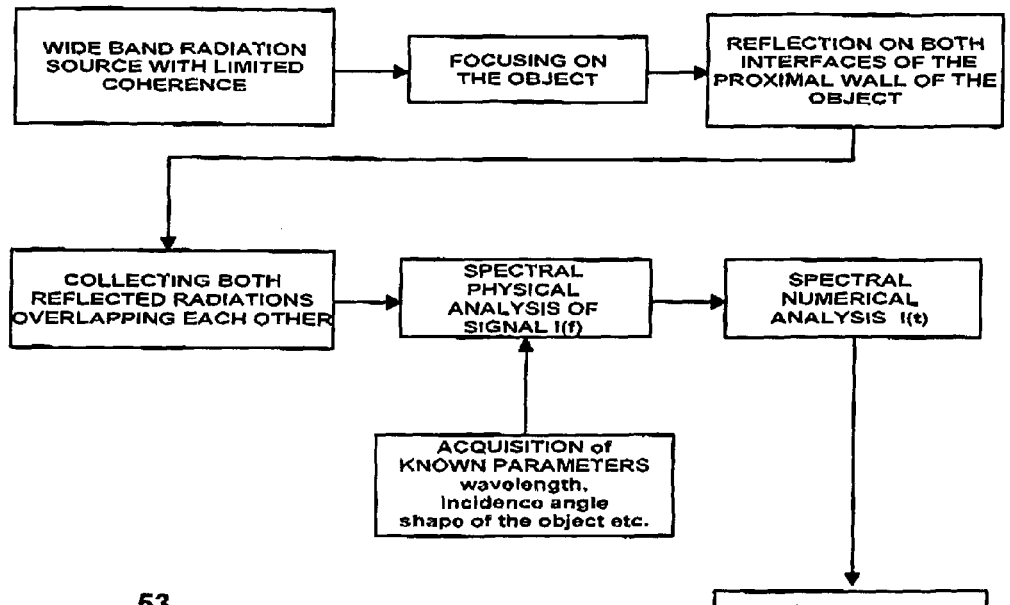
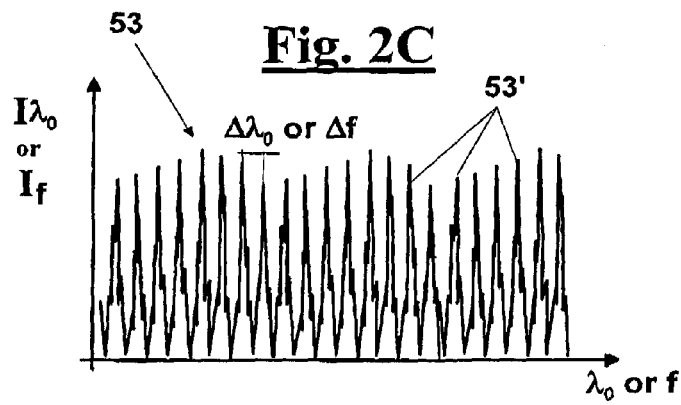
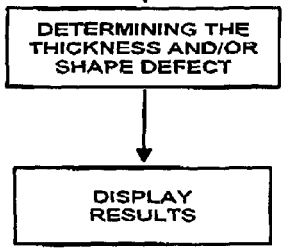
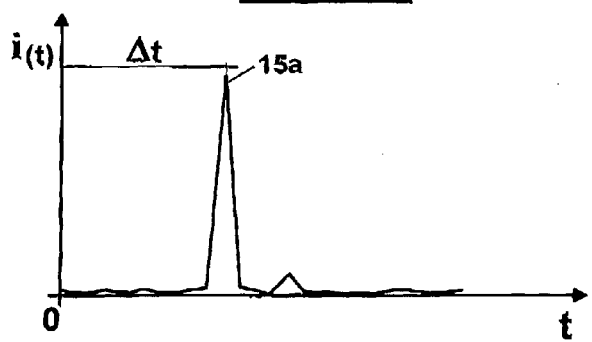

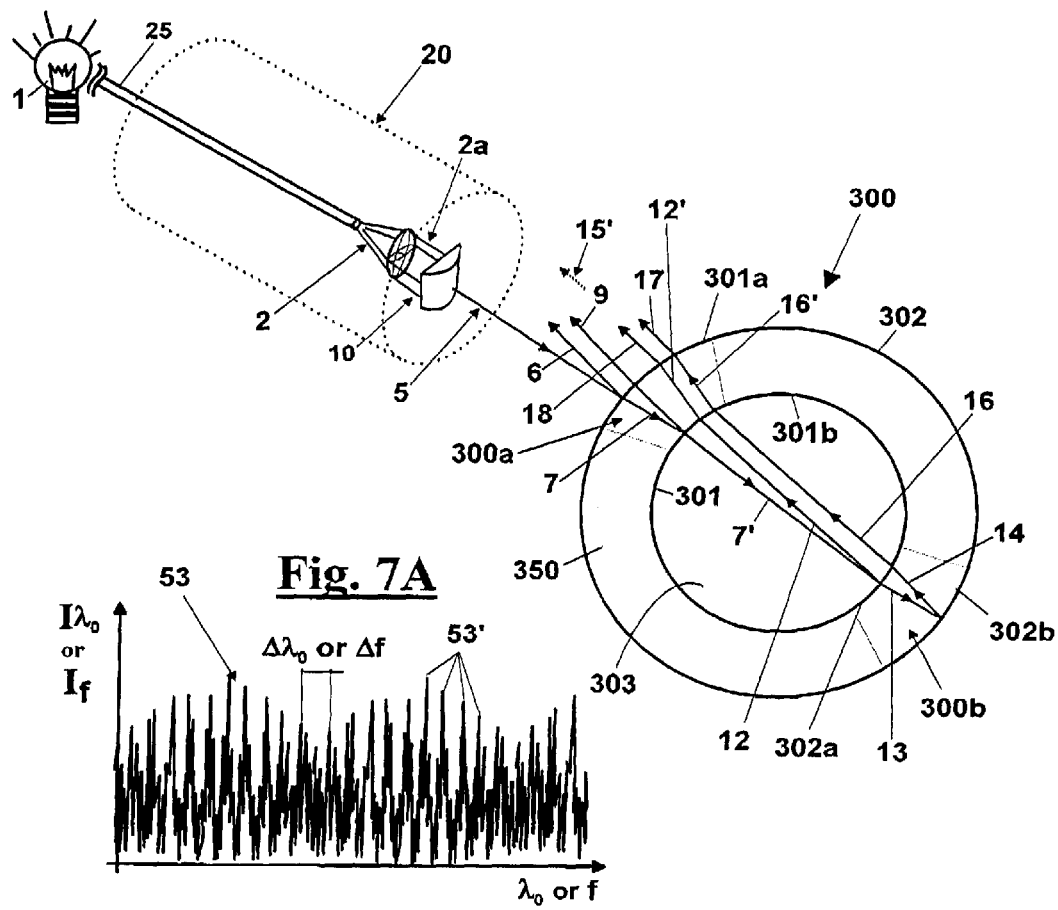
Fig. 6
Fig. 7A
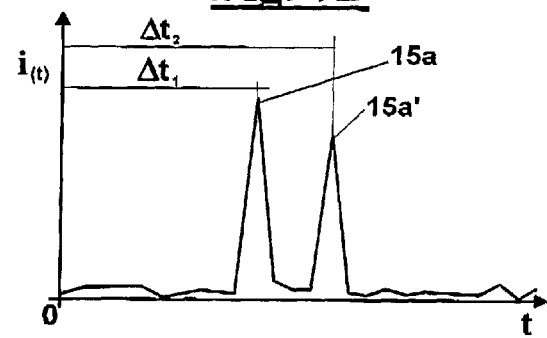
Fig. 7B

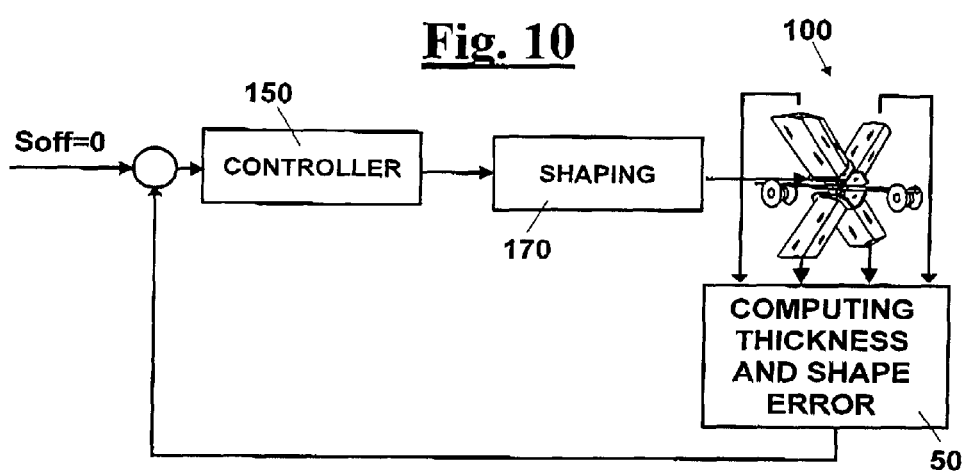
Fig. 10
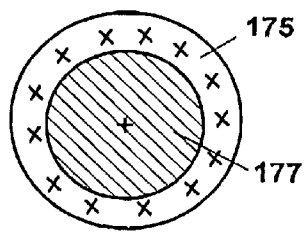
Fig. 11A
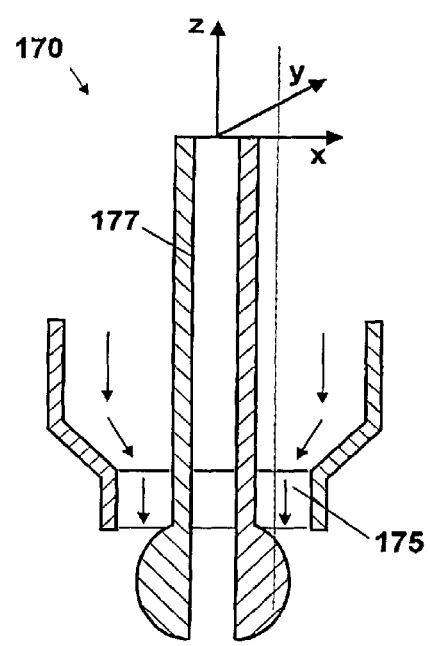
Fig. 11
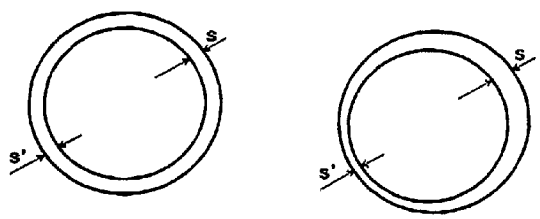
Fig. 12  Fig. 12A

METHOD AND APPARATUS FOR MEASURING THE THICKNESS OF A TRANSPARENT OBJECT IN AN AUTOMATIC PRODUCTION LINE

FIELD OF THE INVENTION

The present invention relates to the production of transparent objects whose thickness has to be determined.

In particular, but not exclusively, the invention relates to a device for measuring the thickness of transparent objects obtained in automatic production lines.

Even more in particular, the invention is applicable to production lines of glass tubes.

BACKGROUND OF THE INVENTION

The production of transparent objects in various shapes plays an important role in view of the many applications of such objects. In some fields, many transparent products are obtained converting a semifinished glass product.

A high quality of semifinished glass products is often desired in order to achieve particular dimensional characteristics. Among these, a very relevant parameter, is the thickness of its walls.

Among the products whose thickness has to be controlled precisely there are glass tubes, which are produced continuously on special automatic production lines.

The determination of the thickness of glass tubes is used, furthermore, to obtain an indirect measure of the inner diameter of the tube, which is otherwise difficult to be measured on the production lines, for the difficulty of putting sensor elements of measuring instruments within the tube.

Among the many articles obtained starting from a glass tube, for example, the following can be cited: containers used in pharmaceutics such as vials, small bottles, carpules, syringes, as well as devices for laboratories such as graduated cylinders, pipets, burettes, refrigerant tubes, etc., adopted in chemical laboratories, and also sleeves for tubes used in the solar collectors.

In the industrial field, glass tubes have to comply with particular quality adjustments and predetermined dimensional characteristics for allowing their use on the converting production lines.

One of the defects that can affect the quality of the glass tube is a disuniformity of its thickness i.e. a non-coaxiality between the outer surface and the inner surface, with negative consequences on the workability of the final product.

The most common, practical, precise and flexible process for making glass tubes, with diameters and thicknesses that cover most of the market needs, provides a step of hot shaping that is carried out downstream of an oven in an automatic production system which can develops either at an angle or vertically.

More precisely, the production system which develops at an angle consists of a rotating hollow mandrel on which a "casting beak" casts a continuous flow of glass. Through the recess air is insufflated, in such a way that the free end of the mandrel generates a tube.

Alternatively, the machine which develops vertically consists of an orifice, made directly on the bottom of the inlet channel of the molten glass. In the orifice a "bell" is suspended, normally not rotating, which blocks partially the orifice and leaves a circular slit through which the molten glass passes. This way, the molten glass is cast through the orifice sliding on the outer side of the bell, and is still plastic in order to form the tube.

In both cases the tube is then "pulled" by a special machine arranged at a certain distance (where the temperature of the tube is enough low), at the beginning of a conveyor comprising substantially horizontal rollers. The size of the tube is controlled automatically and continuously acting on the flow rate and pressure of air, and on the pulling speed (oblique production line), or acting on the temperature of the zone of the orifice (vertical production line), responsive to the diameter and of the determined thickness of the tube.

It has been found that the defect of non-concentricity has more relevance for the vertical production line, where it is possible to correct it under small movements of the bell. The problem is that the measurement of concentricity is normally made "off-line" i.e. when the tube already reached the end of the line and has been cut, thus obtaining a measurement in absolute value, but loosing the information on the direction of the non-concentricity. To obtain this information it is necessary to provide on the measured tube a sign at the angular reference of the orifice. Typically the surface of the tube is "marked" with a pen of a suitable material in a fixed position, nearest to the orifice, so that non-concentricity is referred to the reference system of the orifice, and then the correction of the position of the bell is determined.

This procedure causes various drawbacks, among which the main is the need to deposit extraneous material on the glass tube, with the risk of leaving residues on the rollers and on the many conveying devices, causing also high risk of contamination of the product, which is typically destined to the market of pharmaceuticals. For avoiding this risk, after the step of marking, all the marked tube glass product is rejected and discarded, and since the adjustment by marking can last different tenths of minutes, a huge loss of material, efficiency, as well as costs, and energy waste occur.

Moreover the step necessarily affects the thermo-mechanical balances on which the process is based, with the effect measuring the process in a transient in which the adjustments are made, instead of a steady status.

Finally owing to the high temperature, the measurement is critical, further limiting the precision and the frequency with which it can be carried out.

It is therefore desirable to measure shape defects of the glass tube immediately downstream of the formation step, possibly by means of a "contactless" measurement, in order to intervene in the formation step just upstream of the measurement step in real time, and correcting the defect, limiting to the minimum the waste of product, and especially the risks of bad quality of the product. In fact, by making a precise measurement of the thickness of the tube, it is possible to adjust the step of tube shaping to avoid thickness defects.

Among the known thickness measurement systems of transparent object the interferometric one is known that provides sending a light beam on the transparent object and collecting the reflected radiation. More precisely, the reflection is exploited taking into account that both the outer surface and the inner surface produce a reflected light component, even if of minimum intensity (for the glass each reflected light component is about 4% of the incident radiation on the interface). This way, the reflected light beam is given by the overlapping of two reflected radiation having amplitude of the same order of quantity and, said currents being phase-shifted from each other, corresponding to a longer path made by the reflected radiation through the inner surface with respect to that reflected by the external surface. Such overlapping causes phenomena of interference, which can be examined to determine the difference of path, and then the thickness.

This type of measurement is common for computing the thickness of a film thin whose thickness is up to some micron, but for larger thicknesses technologies of collecting and controlling the signal are required, of much higher precision, and a more advanced and expensive apparatus are needed.

For this reason, it is necessary to collect the reflected radiation in the in the most effective way possible, in order to obtain a signal for computing the thickness of glass objects, about two or three orders of magnitude thicker with respect to the film thin.

Further problems, concerning the automatic production lines of glass tubes, are due to the fact that the glass tube is not perfectly still, because it runs quickly, and then it is subject to movements and vibrations, such that the reflected radiation has a variable direction, and the lower is the diameter of the tube the higher is the flexibility, causing large difficulty in the collecting it reliably for spectroscopic analysis.

It is therefore desirable that the collected reflected radiation is minimally influenced by a possible vibration or small movement of the glass tube, or more normally of the glass object whose thickness has to be determined, and to collect a sufficient output signal for carrying out a spectroscopic analysis.

Yet another consideration is that, if applied to a glass tube or other object with curved surface that is invested by a light beam, in order to determine the thickness by spectroscopic analysis, the existing measuring systems can provide the sought thickness data only from the side of the wall invested by the beam, i.e. that receives the incident radiation and recovers a reflected radiation that can be collected at the same side from which the incident beam comes. For determining the thickness of a sufficient number of points, it is then necessary to carry out more measurements and then prearranging a number of instruments higher for increasing the thickness measurement points. This causes a subsequent increasing of necessary costs and of resources.

It is therefore desirable to determine the thickness and especially its variation in a number appropriate of points, in order to determine any defects of shape, i.e. non-coaxiality between the inner surface and the external surface, without an increase of the costs.

SUMMARY OF THE INVENTION

It is a feature of the present invention to provide a method for measuring the thickness of a wall of a transparent object that makes it possible to obtain a precise thickness measurement and not influenced by vibrations or small movements of the object same.

It is also a feature of the present invention to provide a method for measuring the thickness of a wall of a transparent object for determining the thickness of objects, in particular glass tubes that are conveyed at a high speed on a continuous production line.

It is another feature of the present invention to provide a method for measuring the thickness of a wall of a transparent object, in particular a glass tube, which allows determining the thickness of several points, in order to determine a possible shape defect.

It is a further feature of the present invention to provide a method for measuring the thickness for determining at the same time the thickness of a proximal wall and of a distal wall in a glass tube.

It is also a feature of the present invention to provide a measuring apparatus for determining the thickness of a wall of a transparent object that achieves the same objects.

It is also a feature of the present invention to provide a measuring apparatus for determining the thickness of a wall of a transparent object for being installed on a continuous production line.

It is also a feature of the present invention to provide a measuring apparatus for determining the thickness of a wall of a transparent object that is structurally cheap and easy to make.

These and other objects are achieved, in a first aspect of the invention, by a method for measuring the thickness of a wall of a transparent object, in particular a curved object, said wall comprising: a transparent material, a proximal interface arranged between the environment and said transparent material, and a distal interface arranged between said transparent material and said environment opposite to said proximal interface, said method providing the steps of:
prearranging a starting light radiation;
focusing said starting light radiation obtaining an entering light radiation directed towards said wall so that said entering light radiation:
hits said proximal interface of said wall,
is in part reflected by said proximal interface, in order to generate a first reflected radiation,
crosses in part said transparent material hitting upon said distal interface and is in part reflected by said distal interface;
crosses in part in an opposite direction, after the reflection on said distal interface, said transparent material hitting upon again and crossing said proximal interface, in order to generate a second reflected radiation;
collecting an overall exiting light obtained by overlapping said first and second reflected radiations;
analysing said exiting light radiation with spectroscopic methods, in order to determine the thickness of said wall according to interference characteristics between said first and second reflected radiations,
whose characteristic is that
said step of focusing provides obtaining said entering light radiation through non-axisymmetric lens means having two main meridians such that said entering light radiation is focused on a first virtual focus in a plane defined by a first meridian plane and said source direction, and on a second virtual focus in a plane defined by the second meridian and said source direction.

In particular, said step of focusing provides one among the following conditions:
said first/second virtual focus is located at a finite position beyond said wall and said second/first virtual focus is located substantially at said wall;
said first/second virtual focus is located substantially at the infinite and said second/first virtual focus is located substantially at said wall;
said first/second virtual focus is located substantially at the infinite and said second/first virtual focus is located at a finite position beyond said wall.

This way, it is obtained that the collected radiation is substantially independent from possible movements of said transparent object, and this allows a remarkable reliability and robustness of the measurement with respect to fluctuations and vibrations of said object.

In particular, said step of collecting provides a step of focusing said overall exiting light radiation, such that the light fraction collected from said overall exiting light radiation has enough energy to allow determination, by said step of analysing, the thickness of said wall.

In a preferred exemplary embodiment, said step of collecting is effected by said lens means that are hit by said exiting light radiation in a direction which is opposite to said source direction. This way, the same non-axisymmetric lens means operate at the same time as a means for focusing the entering radiation, directed towards the wall of the object, and as a means for focusing the reflected exiting radiation from the wall of the object.

Advantageously, said step of focusing provides a step of adjusting the position of said non-axisymmetric lens means for adjusting the position of said first and second virtual focus to obtain one of said conditions of optimal focusing. This way, by adjusting the position of the non-axisymmetric lens means, in one of the above described focusing conditions, it is possible to optimize the step of collecting, in particular the energy of the overall exiting light radiation, and the quality of the interference between the first and second reflected radiations. This makes it possible to optimize, furthermore, the next step of analysis and then the thickness measurement precision.

In particular, said transparent object is a tube having a tubular wall, in particular cylindrical, comprising a side surface and an inner surface that defines a tubular recess with a respective axis, said entering light radiation hitting for first upon a tubular proximal portion, in order to determine the thickness of said tubular proximal portion according to interference characteristics between said first and second reflected radiations exiting from said tubular proximal portion.

If the transparent object whose thickness has to be measured is a tube, then the main meridians are one parallel and the other perpendicular to the axis of the tube.

Advantageously, said steps of prearranging a starting light radiation, of focusing said entering starting light radiation obtaining an entering light radiation directed towards said tubular wall, of collecting an exiting light radiation and of analysing said exiting light radiation is done for a plurality of different points in order to measure for each of said points the thickness of the tubular proximal portion frontally facing towards the respective entering light radiation.

In particular, said plurality of points are rotationally spaced about said tube. This way, it is possible to measure the thickness of the glass tube in more points angularly distant from each other, and then to obtain the variation of thickness of the tube in a circumferential direction, detecting this way shape defects, for example lack of concentricity between the side internal and external surfaces.

Alternatively, or in combination, said plurality of points are longitudinally spaced from each other along said tube. This way, it is possible to measure the thickness of the tube at the same time in more points longitudinally spaced from each other, for increasing the number of measurement points. In particular, in case the tube rotates about its own axis and at the same time advances longitudinally, it is possible to obtain the variation of thickness of the tube in a circumferential direction, detecting this way shape defects and their evolution during the advancement. The latter solution must provide a certain advancement rate of the tube with respect to the rotation, in order to define a helical development, responsive to the advancement rate and the rotation of the tube about its own axis, which is substantially different from the advancement rate of the tube during the step of forming the tube and then from the corresponding helical forming development. This way, by providing differentiated steps it is possible to measure the differences of thickness since the measurement points do not lay in the a helical development of formation of the tube.

An accurate mapping with more points in a circumferential direction of the tube that permits determining a possible shape defect, can be used, for example, for phasing shape defects in case the ends of two tubes or portions of tube are coupled frontally to each other. This way, by knowing the shape of both ends to couple it is possible to orient them rotating them about their own axis, in order to obtain an optimal matching that can typically be made by welding or gluing the ends.

In particular, a step is provided of controlling the production of said transparent object associated with said step of analysing, such that, on the basis of detected thickness value, said step of controlling the production operates and controls a shaping step of said object, in particular of said glass tube. This way, it is possible to correct the shaping step of the glass tube according to the shift from a predetermined thickness, or in case shape defects are present.

More in particular, said step of controlling the production of said transparent object associated with said step of analysing, analyses and correlates with each other the thicknesses determined for said plurality of points, rotationally and/or longitudinally spaced about said tube, and in the presence of thickness errors or shape defects of the tube, adjusts the glass shaping process accordingly. For example, in case of continuous production of glass tube that provides a casting orifice within which a tube shaping element is arranged, said step of controlling provides a feedback control of the position of said tube shaping element.

Advantageously, in case of said tube, said entering light radiation encounters a first time said tubular wall at a tubular proximal portion, in part crosses said tubular proximal portion of said tubular wall and enters said tubular recess creating a second entering radiation, said second exiting radiation crosses the recess and encounters a tubular distal portion of said wall, and is focused in such a way that:
  hits a proximal interface of said tubular distal portion,
  is in part reflected by said proximal interface of said tubular distal portion, in order to generate a third reflected radiation,
  crosses in part said transparent material of said wall hitting upon a distal interface of said tubular distal portion and is in part reflected by said distal interface;
  crosses again said transparent material of said wall hitting upon said proximal interface and crosses said proximal interface generating a fourth reflected radiation;
  said third and fourth reflected radiation cross said recess and said tubular proximal portion generating a fifth and sixth reflected radiations that are overlapped to said first and second reflected radiations,
  so that said overall exiting light radiation is obtained by an overlapping of said first and second reflected radiations, as well as of said fifth and sixth reflected radiations, and said step of analysing said overall exiting light radiation with spectroscopic methods is configured to determine both the thicknesses of said tubular proximal portion and of said tubular distal portion of wall according to interference characteristics between said first, second, fifth and sixth reflected radiations.

This way, it is possible to determine the thickness of the proximal portion and of the distal portion of the tube by a single measure. The value of both the thicknesses is determined by selecting and identifying on the exiting radiation, i.e. on the spectrum of interference between the first, second, fifth and sixth reflected radiations, the data of thickness detecting the proximal and distal portions.

In this case, said step of focusing provides one among the following conditions:

said first/second virtual focus is located substantially on said tubular proximal portion and said second/first virtual focus is located beyond said distal wall, and, in particular, substantially at the infinite;

said first/second virtual focus is located within said tube i.e. beyond said tubular proximal portion and before said axis, and said second/first virtual focus is located beyond said distal wall, and, in particular, substantially at the infinite;

said first/second virtual focus is located within said tube i.e. beyond said tubular proximal portion and at said axis, and said second/first virtual focus is located beyond said distal wall, and, in particular, substantially at the infinite;

said first/second virtual focus is located within said tube beyond said axis, and said second/first virtual focus is located beyond said distal wall, and, in particular, substantially at the infinite;

said first/second virtual focus is located substantially on said tubular distal portion and said second/first virtual focus is located beyond said distal wall, and, in particular, substantially at the infinite;

said first/second virtual focus is located beyond said tubular distal portion and said second/first virtual focus is located beyond said distal wall, and, in particular, substantially at the infinite;

said first/second virtual focus is located substantially on said tubular proximal portion and said second/first virtual focus is located substantially on said tubular distal portion.

This way, the collected radiation contains enough energy for determining, through said step of analysis, the thickness both of the tubular proximal portion and of the tubular distal portion of the tube with a good rate of reliability and robustness of the measurement with respect to fluctuations and vibrations of said tube. This way, with the double contemporaneous measurement of the thickness of the tubular proximal portion and of the tubular distal portion it is possible to obtain corresponding measurements of portions opposite to each other with respect to the axis of the tube for each application point of the incident radiation and then a double number of measurement points with a same measuring instrument. In this case, the step of adjusting the position of the non-axisymmetric lens means can adjust the position of said first and second virtual focus, in order to optimize the interference characteristics between the first, second, fifth and sixth reflected radiations and the energy collected for them. More in particular, the step of adjusting the position allows selecting the interference signals relative to the tubular proximal portion and to the tubular distal portion and of distinguishing them from each other. In other words, an adjustment is obtained that tends to show the interference signals between the first and second reflected radiations and between the fifth and sixth reflected radiations.

In another aspect of the invention, a measuring apparatus is provided for determining the thickness of a wall of a transparent object, in particular a curved object, said wall comprising: a transparent material, a proximal interface arranged between the environment and said transparent material, and a distal interface arranged between said transparent material and said environment opposite to said proximal interface, said apparatus comprising:

a means for emitting a starting light radiation;

a means for focusing said starting light radiation that is configured to obtain an entering light radiation directed towards said wall so that said entering light radiation:

hits said proximal interface of said wall, is in part reflected by said proximal interface, in order to generate a first reflected radiation, crosses in part said transparent material hitting upon said distal interface and is in part reflected by said distal interface;

crosses in part in an opposite direction, after the reflection on said distal interface, said transparent material hitting upon again and crossing said proximal interface, in order to generate a second reflected radiation;

a means for collecting an overall exiting light obtained by overlapping said first and second reflected radiations;

a means for analysing said exiting light radiation with spectroscopic methods, in order to determine the thickness of said wall according to interference characteristics between said first and second reflected radiations, whose characteristic is that said means for focusing comprises a non-axisymmetric lens means for obtaining said entering light radiation, said non-axisymmetric lens means having two main meridians such that said entering light radiation is focused on a first virtual focus defined by a first meridian plane in said source direction, and on a second virtual focus defined by the second meridian and by the source direction.

In particular, said means for focusing is configured to obtain one among the following conditions:

said first/second virtual focus is located at a finite position beyond said wall and said second/first virtual focus is located substantially at said wall;

said first/second virtual focus is located substantially at the infinite and said second/first virtual focus is located substantially at said wall;

said first/second virtual focus is located substantially at the infinite and said second/first virtual focus is located at a finite position beyond said wall.

In particular, said means for collecting provides a means for focusing said overall exiting light radiation, such that the energy of said overall exiting light radiation makes it possible to optimize the interference characteristics and to determine, by said means for analysing, the thickness of said wall.

In a preferred exemplary embodiment, said means for collecting comprises said non-axisymmetric lens means that is hit by said exiting light radiation in a direction which is opposite to said source direction. This way, said means for focusing said exiting radiation and said means for collecting said exiting radiation coincide.

Advantageously, said means for emitting and said non-axisymmetric lens means are connected to each other by means of an optical fibre coupling, in particular of single-mode type.

In particular, said means for collecting and said means for analysing are connected to each other by means of an optical fibre coupling, in particular of single-mode type.

With similar advantage, said means for emitting and said means for analysing, each coupled by optical fibres, are housed within a same central optical unit, equipped with at least one optical fibre connector.

Preferably, said means for emitting and said means for analysing coupled by optical fibres, are connected by a beam splitting device to a single optical fibre that works at the same time as exiting radiation coupler for the radiation emitted by said means for emitting, and as entering radiation coupler for said means for analysing.

Advantageously, said means for focusing and said means for collecting the radiation, in particular coincident to each other, integrally to the optical fibre coupling devices, are integrated in a detection probe equipped with at least one single-mode optical fibre connectors.

Advantageously, a position adjustment means is provided of said non-axisymmetric lens means for adjusting the position of said first and second virtual focus to obtain a condition of optimal focusing.

Preferably, said probe comprises a means for detecting the distance between said means for focusing and said object, in particular between said detection probe and said object, said means for detecting the distance being associated with said position adjustment means. This way, it is possible to adjust with higher precision the distance between the lens means and the object, in particular the glass tube, in such a way that it is configured to adjust the focusing and to obtain an exiting light radiation with optimal energy and interference characteristics.

In particular, said transparent object is a tube having a tubular wall, in particular cylindrical, comprising a side surface and an inner surface that defines a tubular recess with a respective axis, and has at least one detection probe arranged facing towards a proximal portion of said tube, such that said entering light radiation encounters said tubular proximal portion, in order to determine the thickness of said tubular proximal portion according to interference characteristics between said first and second reflected radiations.

Advantageously, a plurality is provided of probes that is configured to measure a plurality of different points in order to measure for each of said points the thickness of the respective tubular proximal portion. In particular, said plurality of points are rotationally spaced about said tube. Alternatively, or in combination, said points are longitudinally spaced from each other along said tube. This way, using several detection probes it is possible to measure shape defects of the glass tube and parameters of strength of the wall of the tube same.

Alternatively, or in combination, an adjustment means is provided for adjusting the relative position, rotationally and/or longitudinally, of said tube with respect to said detection probe or to said plurality of detection probes, to obtain the thickness measurement of a plurality of different measurement points.

In particular, said plurality of probes is connected to a central optical unit by an optical multiplexer so that, according to a time division operation, each probe, in turn, receives the radiation to focus on the sample, and provides the reflected radiation to analyse, for an time appropriate to obtain a measure enough accurate. This way, it is possible to emit and analyse the signals coming from several probes generated by a single central optical unit with remarkable advantage on the costs of the apparatus. Furthermore, this solution is advantageous also concerning the use and, in particular, of the adjustment of the instrument, since the result of the measure depends typically on the features of the source and by the spectral analyser, which are common to all the probes.

In particular, a means is provided for controlling the production of said transparent object associated with said means for analysing, such that, on the basis of a detected thickness value, said production control means operate the product shaping means, in particular of said glass tube. This way, it is possible to adjust the shaping step of the glass tube according to the shift from a predetermined thickness.

More in particular, said production control means analyse and compare the thicknesses determined by said probes for said plurality of points that are rotationally and/or longitudinally spaced about said tube, and in the presence of thickness errors or shape defects of the tube control the glass shaping process accordingly. For example, for making a continuous glass tube that provides a casting orifice at which a tube shaping element is arranged, said control means is configured to make a feedback control of the position of said tube shaping element.

In a preferred exemplary embodiment, each of said probes is configured to measure the thickness of said tubular proximal portion and of said tubular distal portion opposite to said tubular proximal portion, according to the steps of the above method. This way, under a same number of probes arranged about the tube and to the possible multiplicity of measurement points obtained by moving the probes with respect to the tube, a further doubling of the number of measurements is obtained. Additional savings in the measurement apparatus can thus be obtained.

BRIEF DESCRIPTION OF THE DRAWINGS

The invention will be now shown with the following description of an exemplary embodiment thereof, exemplifying but not limitative, with reference to the attached drawings in which:

FIG. 2B shows a block diagram that describes the main phases followed by the algorithm for calculating the thickness of the wall of the object starting from the reflected signal detected by the optical probe;

FIG. 2C shows a functional diagram of the frequency or wavelength as produced by the spectrometer and collected by a suitable image acquisition device;

FIG. 2D shows a diagram versus time that shows a peak interference value obtained by a numerical analysis of the diagram of FIG. 2C, from which the thickness is obtained of the wall of the object;

FIG. 6 shows an exploded view of the optical detection probe and of the radiation that hits and is reflected for measuring the thickness of a tubular proximal and distal portions opposite to each other of a same tube;

FIG. 7A shows a trend of intensity responsive to the frequency obtained overlapping two comb-like spectra with comparable frequencies f of wavelengths $\lambda$;

FIG. 7B shows a diagram versus time that shows a first and a second peak interference value, from which the thicknesses of the tubular proximal and distal portions of the tube are obtained.

FIG. 10 shows a diagrammatical view of a control program means that is associated with apparatus for measuring the thickness, in order to have a feedback control of defects of air bubbles in the glass tube;

FIGS. 11 and 11A show a cross sectional view of a means for shaping the glass tube associated with the control means FIG. 10;

FIGS. 12 and 12A show respectively a comparison between a glass tube with fixed cross section and a glass tube that has a shape defect, in particular a defect of non-concentricity between the inner surface and the outer surface.

DESCRIPTION OF A PREFERRED EXEMPLARY EMBODIMENT

Figure 1:
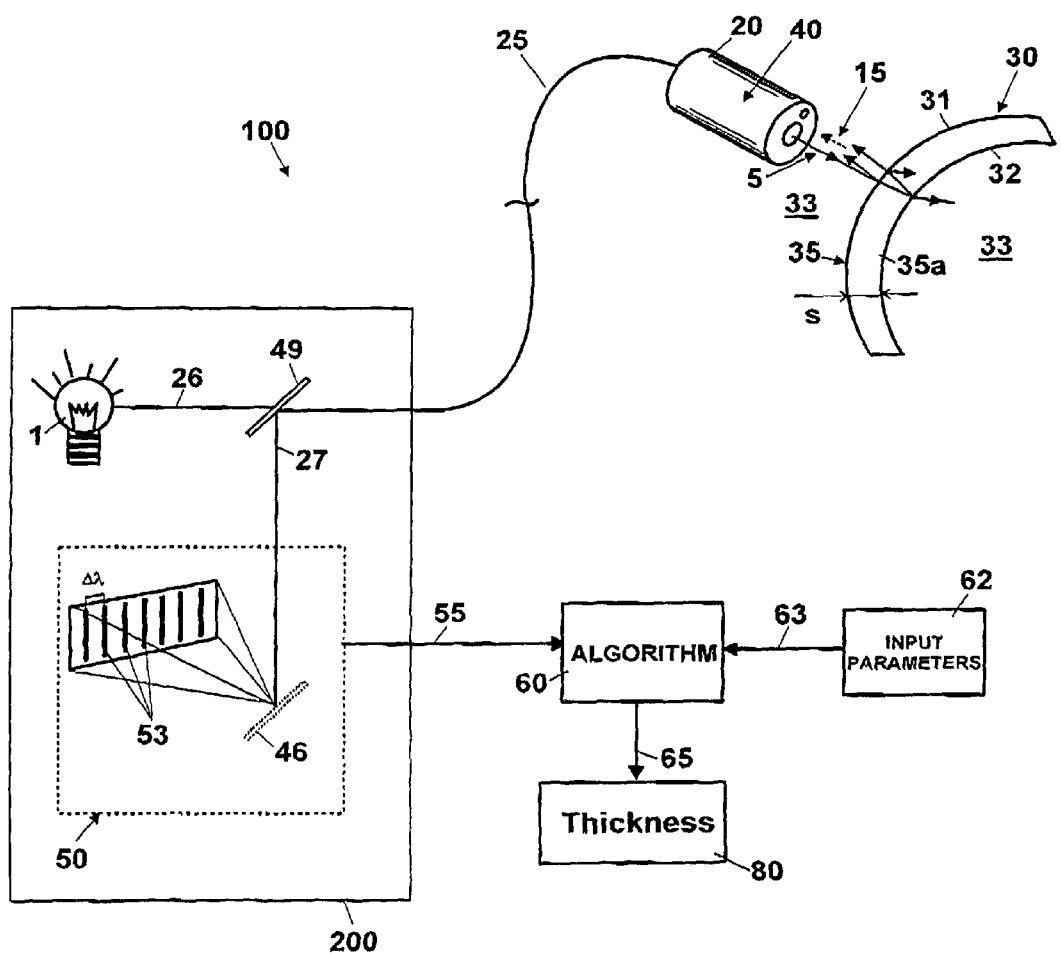
FIG. 1 shows a diagrammatical view of an apparatus, according to the invention, comprising an optical detection probe that is configured to measure the thickness of a wall of a generic transparent object, in particular an object with curved surface, comprising a light source hereafter diagrammatically shown as a light bulb.

With reference to FIG. 1, a measuring apparatus is shown for determining the thickness 100 of a wall 35 of a generic transparent object 30, in particular a curved object, that is configured to provide a relative measuring method. In particular, wall 35 comprises a transparent material 35a arranged between a proximal interface 31, set between an environment 33 and transparent material 35a, and a distal interface 32, set between transparent material 35a and the environment 33.

More in particular, the measurement apparatus for determining the thickness 100 comprises a source 1 of a starting light radiation 2 in a predetermined source direction 3 and a means for focusing 10 (FIG. 2) starting light radiation 2, in order to obtain an entering light radiation 5 directed towards wall 35.

The source 1 is for example a superluminescent diode.

More in particular, starting light radiation 2 is transmitted through an optical fibre 25, in particular a single-mode optical fibre, and hits the means for focusing 10 (FIG. 2), in order to obtain entering light radiation 5. As better shown in FIG. 2, entering light radiation 5 hits proximal interface 31 of wall 35 of the object and is in part reflected by proximal interface 31, in order to generate a first reflected radiation 6. A significant part of entering light radiation 5 is transmitted 7, through transparent material 35a of wall 35, hitting upon distal interface 32, and is in turn reflected 8 by distal interface 32. Radiation 7 generates, furthermore, a transmitted radiation 7' that is transmitted beyond distal interface 32. Reflected radiation 8 instead, crosses again transparent material 35a of wall 35 in an opposite direction hitting upon again and crossing proximal interface 31, in order to generate a second reflected radiation 9. Even in this case, radiation 8 hitting upon proximal interface 31 generates a further reflected component 8'. For example, in case of a material like glass, it is obtained that, starting from an entering light radiation 5 with intensity equal to 100%, the first reflected radiation 6 is likely to have an intensity of 4%, whereas transmitted component 7 an intensity of 96%. In turn, transmitted component 7 will again be transmitted as 7' and reflected as 8, losing a same ratio proportional to 96% intensity of the incident radiation. Reflected radiation 8, crossing again proximal interface 31, generates second reflected radiation 9 that is likely to have an intensity of about 3.8%. It is then difference of intensity of the first reflected radiation 6 and the second reflected radiation 9 that provides a good rate of interference, which allows determining the thickness of wall 35, as described below.

In addition, the measurement apparatus for determining the thickness 100 comprises a collection means 40 for collecting an overall exiting light radiation 15 an overlapping of first reflected radiation 6 and second reflected radiation 9 and a means for analysing 50 (FIG. 1) exiting light radiation 15 with spectroscopic methods, in order to determine the thickness s of wall 35 according to interference characteristics between the first 6 and the second 9 reflected radiation, as described below in detail.

More precisely, collection means 40 can comprise a means for focusing the overall exiting light radiation 15, such that the light fraction collected from the overall exiting light radiation 15 has enough power to determine, by the means for analysis, the thickness s of wall 35. In the preferred exemplary embodiment of FIG. 2, the collection means comprises a lens means 10 that is hit by exiting light radiation 15 in a direction that is opposite to source direction 3. This way, the same non-axisymmetric lens means 10 can operate at the same time as a means for focusing the exiting radiation 5, directed towards wall 35 of object 30, and as a means 10 for focusing exiting light radiation 15 coming from wall 35 of the object. The same lens means 10 can be used in any of the two directions, if exiting light radiation 15 returns towards collection means 40 diverging with the same curvature as converging entering light radiation 5. Such condition, called "confocality by reflection", has to be considered separately for each reflected component 6 and 9 (see hereinafter, 17 and 18). In particular, respective interfaces 31 and 32 (like hereinafter, 301a and 301b, 302a and 302b) are substantially parallel (couples), and define then a wall (for each couple of interfaces), whose distance from the probe is much higher than the thickness s of wall 35, and can be then considered as "confocality by reflection" with reference to each wall, as described in detail below.

Figure 2:
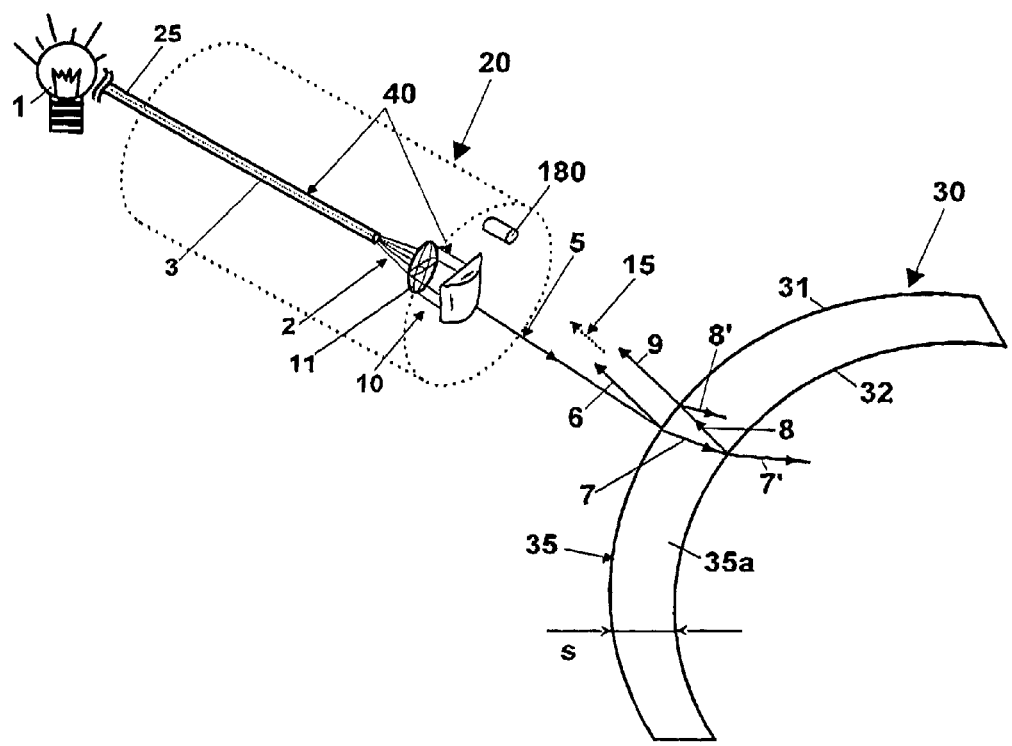
FIG. 2 shows an exploded view of the optical detection probe of FIG. 1, depicting the components to obtain an beam entering directly on the wall and of receiving a reflected radiation from the same wall, in the Fig. A first exemplary embodiment is shown of a non-axisymmetric means for focusing.
Figure 2A:
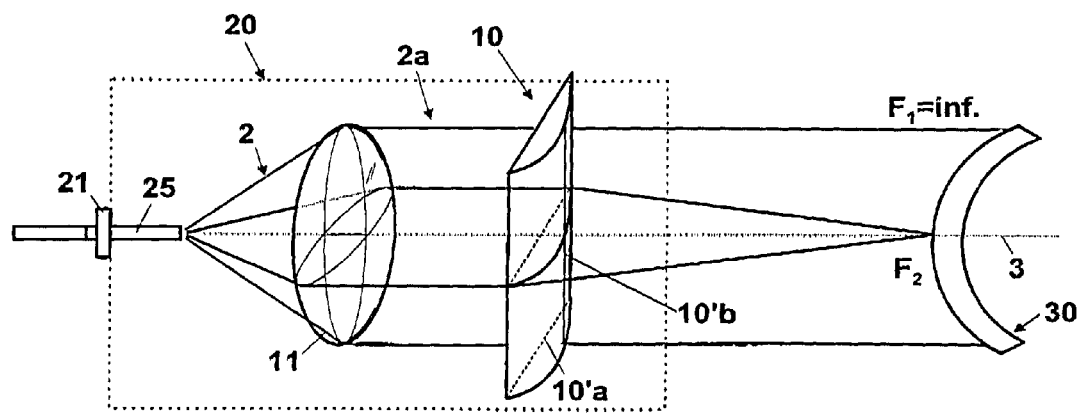
FIG. 2A shows a diagrammatical view of the step of focusing a starting light radiation that makes it possible to obtain an entering light radiation directed towards the wall whose thickness has to be measured.

Therefore, as diagrammatically shown in FIG. 2A, for focusing starting light radiation 2 a non-axisymmetric lens means 10 can be provided to prepare entering light radiation 5. In particular, starting light radiation 2 at the exit of optical fibre 25 is diverging and hits a first lens 11, in order to obtain a substantially collimated radiation 2a that hits in turn the non-axisymmetric lens means 10.

More in detail, the non-axisymmetric lens means 10 have two main meridian planes 10a, 10b orthogonal to each other, such that the entering light radiation 2a is focused on a first virtual focus $F_1$ in the first meridian plane 10a, and on a second virtual focus $F_2$ in second meridian plane 10b. Frequently also the object that has to be measured has a locally not axisymmetric curvature, such as in the case of a surface of revolution, in particular a tube or a container for pharmaceutical use. In this case, also for it meridian planes are defined, and the focusing system is preferably oriented, in order to cause the meridian planes of the lens means 10 to coincide with those of object 30, in order to refer hereinafter as meridian planes 10a and 10b for the means for focusing or for the wall 35 of the object, without referring to any of them, without confusion. This way, it is obtained that the collected radiation 15 is substantially independent from possible movements of the transparent object 30, and this allows a remarkable reliability and robustness of the measurement with respect to fluctuations and vibrations of object 30, as explained below in detail.

Figure 3:
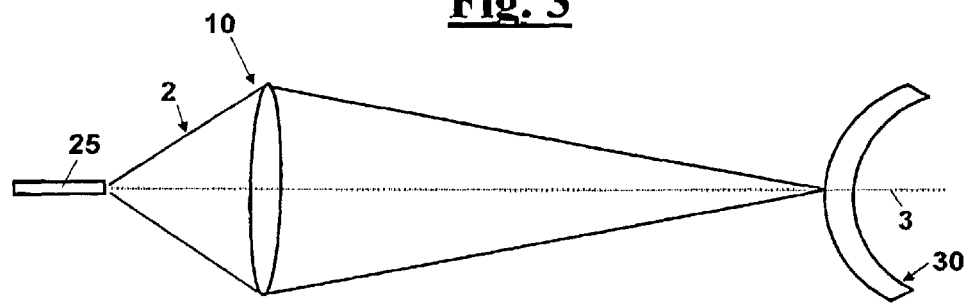
FIGS. 3 and 3' diagrammatically show the possible configurations of confocal focusing by reflection, with reference to a meridian of curvature R.
Figure 3:
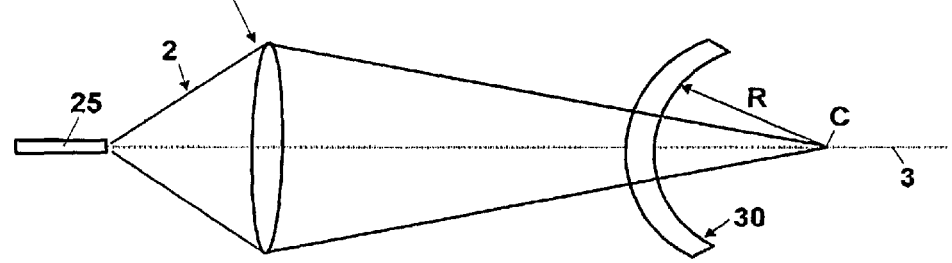

In particular, as shown in FIGS. 3 and 3', the "confocality by reflection" can be obtained independently with reference to any of the two meridian planes 10a, 10b, obtaining mono-optimal or bi-optimal configurations depending on whether the condition is obtained on one or on both the meridian planes 10a, 10b, as described below in detail.

On each meridian plane 10a, 10b confocal reflection can be obtained in two ways: focusing entering light radiation 5 at the wall (FIG. 3) or near the centre of curvature C of wall 35 (FIG. 3').

With a generic object with radius of curvature different on the two meridian planes, only the bi-optimal configuration focused on the surface can be obtained through axisymmetric lens means. For all the other combinations, it is normally necessary to use a focusing system with different focal lengths on the two meridian planes, i.e. astigmatic, obtainable normally by a non-axisymmetric lens 10.

By means practical tests, it can be shown that it is not necessary normally to use bi-optimal focusing configurations. These show in fact a high energy efficiency (high intensity of the returning signal) but also a low robustness to misalignments or vibrations. Vice-versa, configurations that even only approximately are mono-optimal allow to obtain a sufficient energy efficiency, even if increasing the power of the source, obtaining a high robustness with respect to misalignments of the system. Precisely, the condition of confocality is not required for reflections relative to the meridian along which misalignments are possible.

Figure 3A:
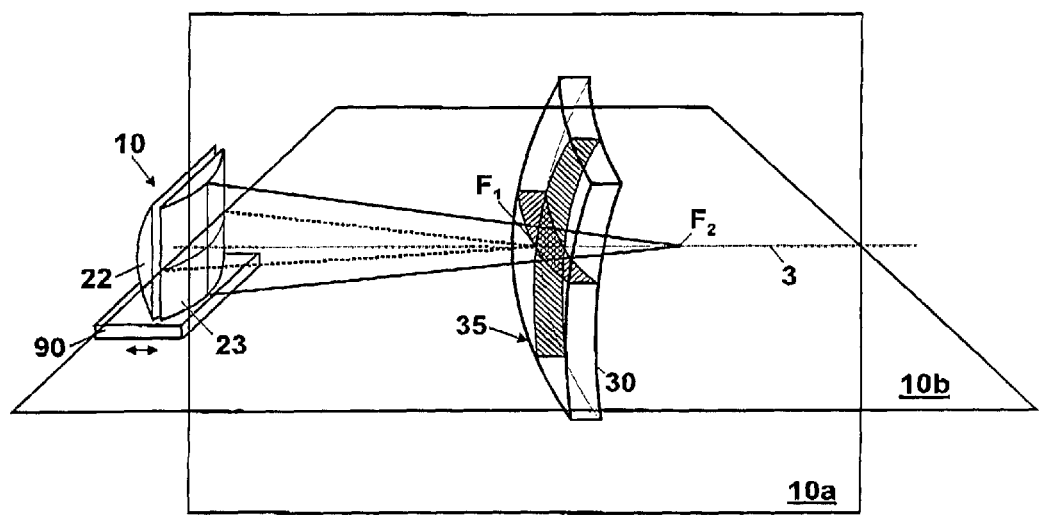
FIGS. 3A to 3C diagrammatically show the focusing configurations of the light beam source that hits the object; in the present figure a second exemplary embodiment is shown of non-axisymmetric means for focusing.
Figure 3B:
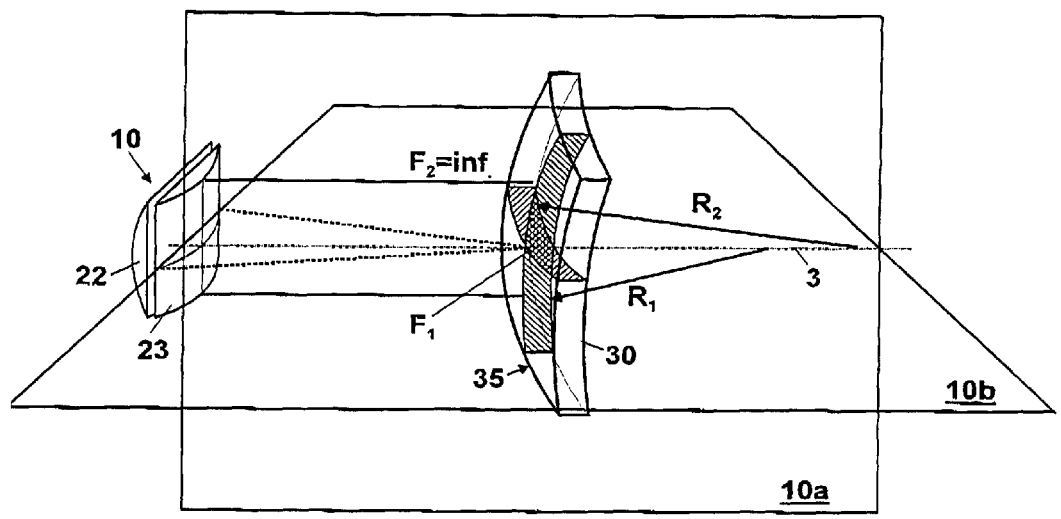
Figure 3C:
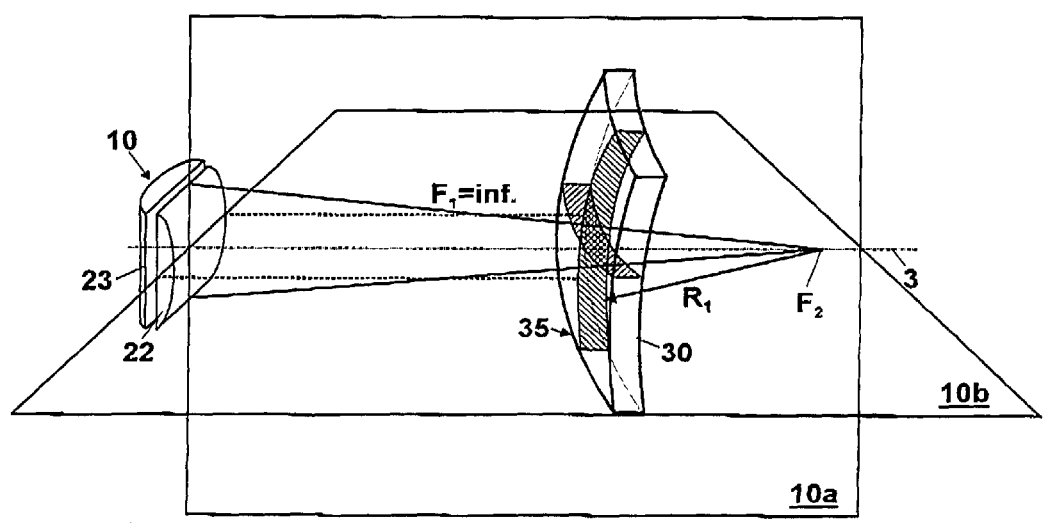

In FIGS. 3A to 3C, different solutions are diagrammatically shown of focusing the obtained radiation source 5 responsive to the conditions of operability of the production line in which the apparatus is arranged, to the kind of object 30 whose thickness has to be measured, and to the kind of transparent material or glass, etc.

In a first focusing condition, as shown in FIG. 3, lens 10 causes the radiation to converge at a first virtual focus $F_1$ substantially at wall 35 and at a second virtual focus $F_2$ at a finite position beyond wall 35. Such configuration, can be obtained for example combining two cylindrical lenses 12, 13 rotated of 90° with respect to each other.

It is useful to specify that the representation of focusing points $F_1$, $F_2$ is purely diagrammatical and ideal and does not show the deflexion to which entering light radiation 5 is subjected in the movement of the various interfaces of the transparent material. In fact, on each meridian plane 10a, 10b, to obtain that entering light radiation 5 is focused at a point beyond wall 35, entering light radiation 5 has to converge towards a point that is located at a distance slightly less (or more) with respect to the actual point of focusing since the wall can work as diverging (or converging) lens and so brings away (or nearer) the effective focus.

In a second condition, first virtual focus $F_1$ is located substantially at wall 35 and second virtual focus $F_2$ is located substantially at the infinite (FIG. 3A). In this case, focus $F_1$ can be located near wall 35 or within its thickness. More in particular, the range of depth of focus about this position of the focus $F_2$ has an amplitude of about +/−4 mm, i.e. the focus $F_2$ can locate up to 4 mm before or after wall 35.

In a third condition, obtained rotating both lenses 22, 23 of 90° about their axis and preferably approaching object 30, first virtual focus $F_1$ is located substantially at the infinite and second virtual focus $F_2$ is located at a finite position beyond wall 35, beyond said range of depth, in particular in the centre of curvature of the wall defined by second meridian plane 10b. (FIG. 3B). In FIG. 3B the radiuses of curvature $R_1$, $R_2$ of wall 35 of object 30 are indicated.

The configuration obtained by FIG. 3B shortening the focal distance from infinite to a finite position (FIG. 3C), shows similar advantages versus robustness to the vibrations, but with higher intensity of the returning signal.

In particular, the configurations described in FIGS. 3B and 3C are obtained simply by adjusting the distance of the lens means 10 with respect to object 30, in order to displace the point where first virtual focus $F_1$ falls. Such configurations are obtained rotating 90° the lenses 22, 23 about optical axis.

The lenses 22, 23 are, furthermore, adjustable in position with respect to each other.

In the above cases, as above described, it is possible to use a single lens or a set of lenses 22, 23 where at least one lens is non-axisymmetric, i.e. astigmatic, obtaining that the collected radiation 15 is substantially independent from possible movements of the transparent object 30, and this allows a remarkable reliability and measuring precision on a continuous production line. In particular, it is obtained that the reflected exiting radiation 15, given by the reflected radiations 6 and 9 overlapped by wall 35 of the object, is enough intense from being analysed by means of spectroscopy, in order to determine the thickness of wall 35 same.

From a structural viewpoint, as shown in FIG. 2, the optical fibre 25, the lens 11 and the non-axisymmetric lens 10, along with collection means 40 for the exiting radiation 15, are integrated in a detection probe 20 equipped with at least one mono-mode optical fibre connector 21 (FIG. 2A). This way, optical fibre 25 connects source 1 with the detection probe 20, (optical path 26) and vice-versa connects detection probe 20 with the means for analysis 50 (optical path 27).

Advantageously, the lens means 10, 11 as diagrammatically shown in FIG. 3, is associated with position adjustment means 90 that is configured to adjust the position of the first $F_1$ and second $F_2$ virtual focus, to obtain one of the above described conditions of optimal focusing. This way, by adjusting the position of the lens means 10, 11 it is possible to optimize the fraction of exiting light radiation 15 collected by the means 40. This allows, furthermore, to optimize the interference characteristics between the first 6 and second 9 reflected radiation and the following step of analysis and then to obtain a better measuring precision the thickness s of wall 35.

Figure 8:
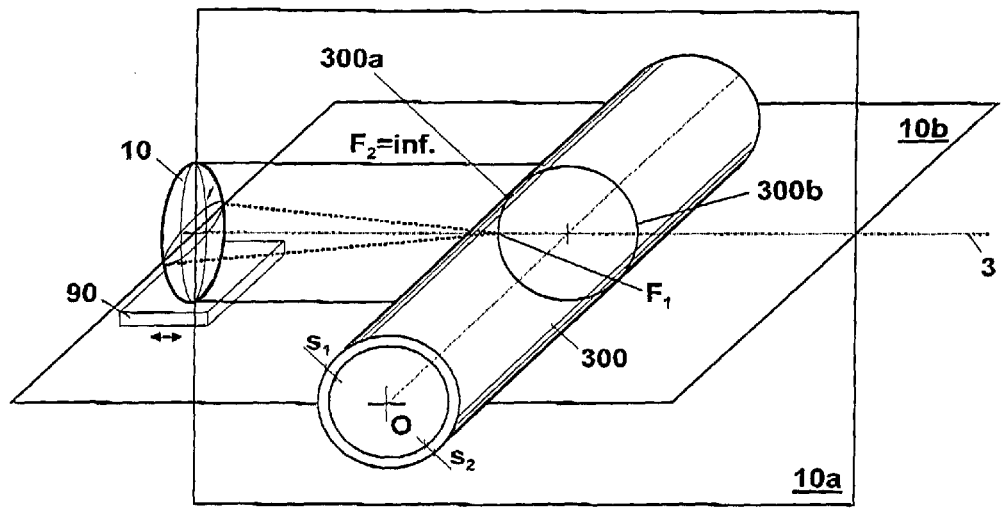
FIGS. 8 to 8I diagrammatically show the focusing configurations of the radiation source that hits a glass tube that is configured to determine the thickness of a proximal wall and at the same time the proximal wall and distal of the tube.

Probe 20 further comprises a means for detecting the distance 180, for example a ultrasonic pulse sensor (FIG. 2), which determine the distance between the means for focusing 10 and object 30, associated with the position adjustment means 90 (FIGS. 3A and 8). This way, it is possible to adjust with higher precision the distance between probe 20 and object 30, in particular the glass tube, in order to adjust the focusing and to obtain an exiting light radiation 15 with optimal interference characteristics.

Even more in particular, the source 1 and the means for analysing 50 are connected to a same optical fibre 25 by a beam splitting device 49, which works at the same time as exiting radiation coupler for the radiation emitted by source 1, along optical path 26, and as entering radiation coupler for means for analysing 50, along optical path 27. Therefore, the exiting radiation 15 reflected by wall 35 crosses the lens means 10 and optical fibre 25 connected to the means for analysing 50 opposite to each other. With further advantage, the source 1 and the means for analysing 50, each coupled by optical fibres, are housed within a same central optical unit 200 (FIG. 1).

This way, the reflected radiation, given by the first 6 and the second 9 reflected radiations overlapped by wall 35, runs in optical fibre 25 in opposite directions up to reaching the beam splitting device 49, or beam splitter, which deviates it generating an optical signal that passes through optical path 27, towards the means for analysis 50. The optical signal on optical path 27 passes through a spectral analyser 46, for example a grating, and generates on a suitable image acquisition device, for example CCD, a comb-like 53 spectrum (FIG. 2C) with interference bands spaced from each other according to a distance $\Delta\lambda$ inversely proportional to the spatial delay 2sn of the radiation 9 with respect to the radiation 6, which hit respectively the first 31 and the second 32 interface of wall 35. More in particular, the trend of intensity (FIG. 2C') of this spectrum represents the spectral density of the optical power responsive to the wavelength or the frequency of the radiation (FIG. 2C'), and shows alternating peaks finely equispaced with advancement rate ($\Delta\lambda$ or $\Delta f$):

$$\Delta\lambda = -\frac{\lambda o^2}{2sn} \text{ or } \Delta f = \frac{c_o}{2sn}$$

where $\lambda_0$ is the wavelength of the light source;
n is the index of refraction of the transparent material;
s is the thickness of wall 35 of object 30;
$c_0$ is the light speed.

The trend of FIG. 2C', is in turn analysed numerically, for example by means of Discrete Fourier Transform (DFT), obtaining a diagram versus time (FIG. 2D) that shows among the others a peak value 15a whose abscissa refers directly to the opposite to the advancement rate of the spectrum 53 of FIG. 2C, which is directly proportional to the spatial delay 2 ns.

$$\text{In formula } \Delta t = 1/\Delta f = \frac{2s}{c_o/n}$$

the delay time $\Delta t$ is defined corresponding to said spatial delay 2 ns and from which, by knowing the index of refraction n of the material, the thickness s is obtained.

More in general, according to the block diagram of FIG. 2B, by the comb-like spectrum 53 an output signal 55 is obtained that is computed by a microprocessor 60 that runs a predetermined algorithm. In particular, the algorithm executes the above described Discrete Fourier Transform on the comb-like spectrum 53 associating it with some input parameters 62. Such parameters 62 are relative mainly to the index of refraction n, to the geometry of object 30 as well as to the wavelength of the light incident beam, to the angle of incidence, typically orthogonal, etc.

Microprocessor 60 outputs a value 65, that can be shown on a display 80, which represents the thickness s of wall 35 of the transparent object 30.

Figure 4:
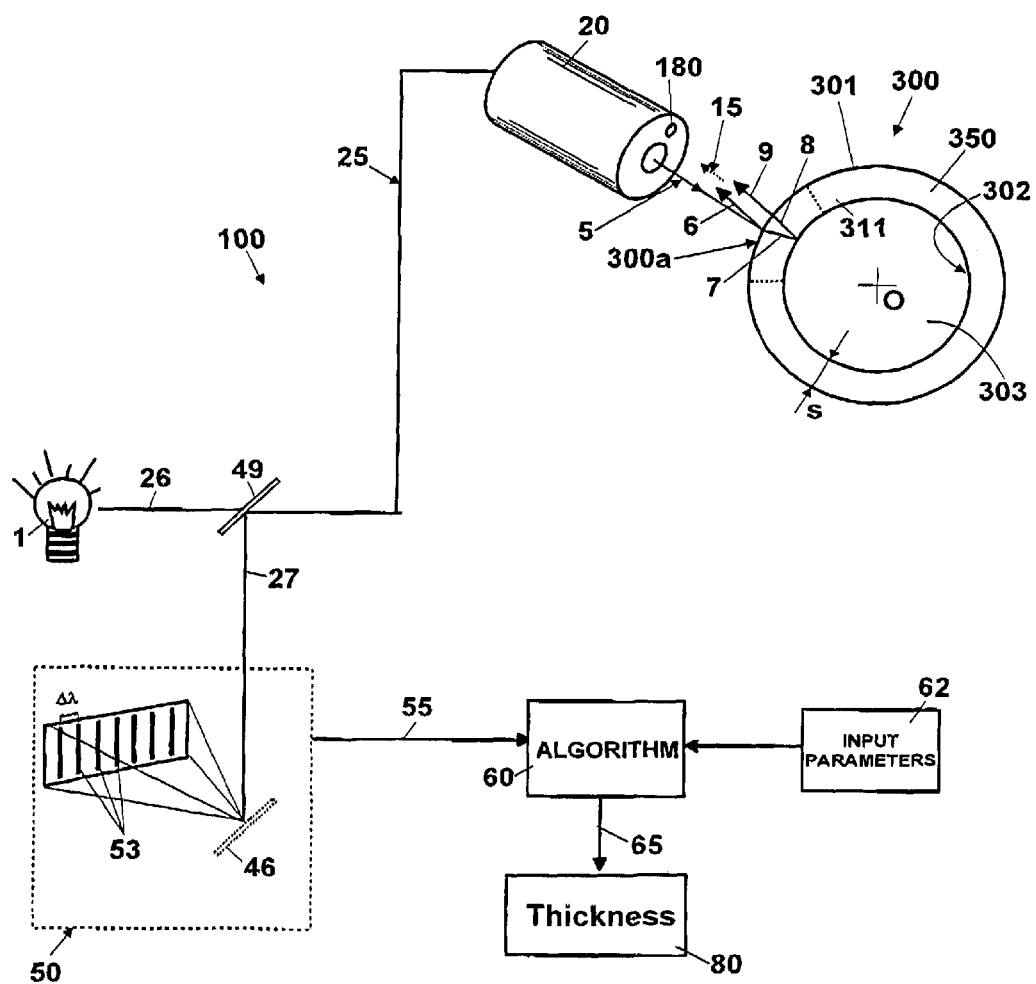
FIG. 4 shows a diagrammatical view of the measurement apparatus for determining the thickness of FIG. 1, applied to the measurement at least at one point of the thickness of a glass tube.

As shown in FIG. 4, in a particular application of the thickness measurement apparatus 11, the transparent object is a tube 300, for example a glass tube, with a tubular wall 350, in particular cylindrical, comprising a side surface 301 and an inner surface 302 that defines a tubular recess 303 with a respective longitudinal axis O. This way, the entering light radiation encounters for first a tubular proximal portion 300a, in order to determine the thickness of the same according to interference characteristics between the first 6 and second 9 radiations reflected by tubular proximal portion 300a. In this case, in a way not shown, the main meridians are one parallel and the other perpendicular to the axis O of tube 300.

Figure 5:
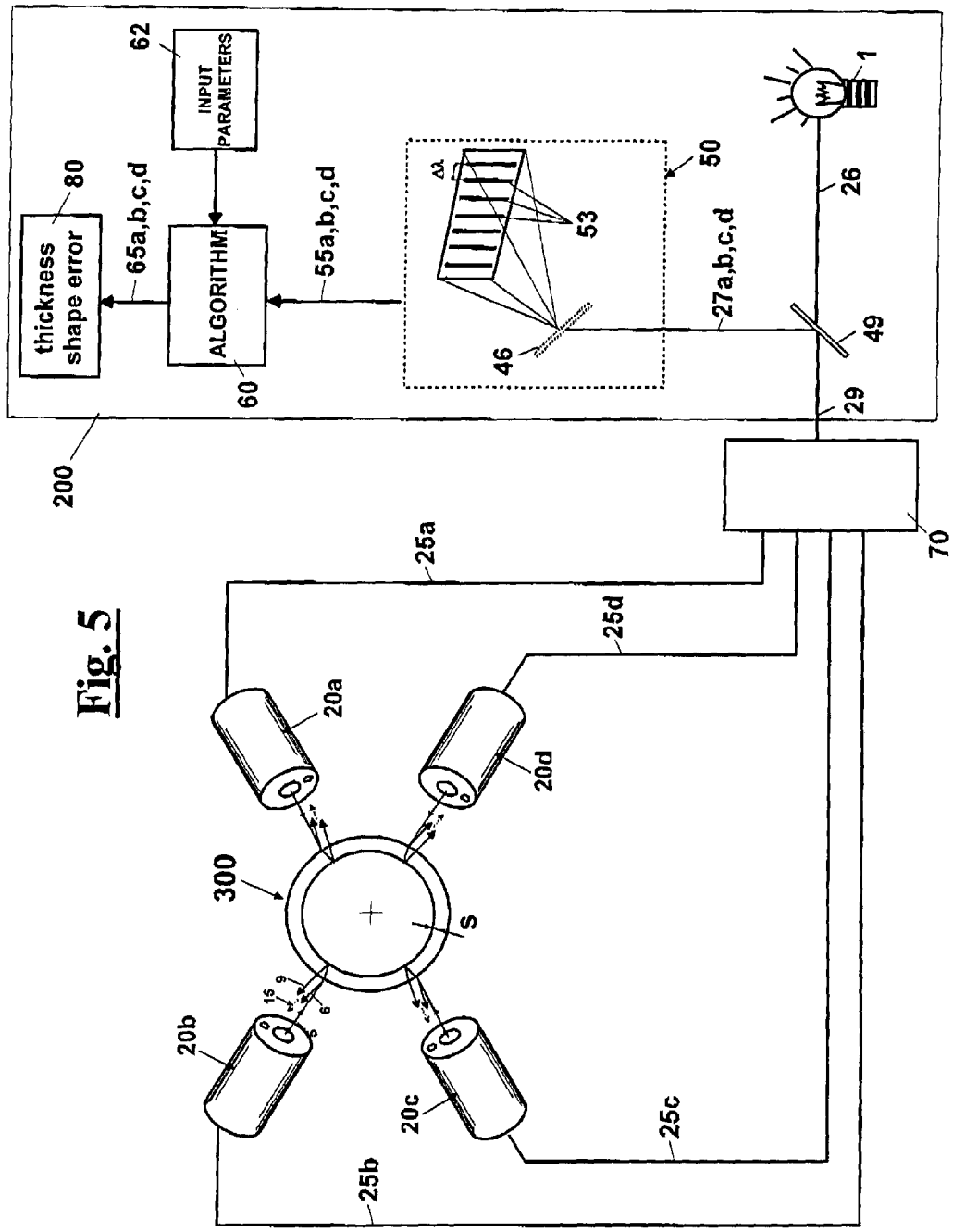
FIG. 5 shows a diagrammatical view of an exemplary embodiment of the measurement apparatus for determining the thickness of FIG. 4, which comprises several optical detection probes, in order to determine the thickness of more points arranged circumferentially on a tube; the double reflection on each wall is simplified.

In a possible exemplary embodiment, in apparatus 100, as shown in FIG. 5, a plurality of probes is provided, in particular four optical detection probes 20a, 20b, 20c and 20d that are configured to measure a plurality of different points, in order to measure for each point the thickness of the respective tubular proximal portion 300a. In particular, the plurality of points are rotationally spaced from each other about tube 300. This way, it is possible to measure the thickness of the glass tube in more points angularly distant from each other, and then to obtain the profile of thickness of the tube in a circumferential direction, detecting this way any shape defects, for example lack of concentricity between inner surface 302 and external surface 301.

Alternatively, or in combination, in a way not shown, the plurality of measurement points are longitudinally spaced from each other along tube 300. This way, it is possible to measure the thickness of the tube at the same time in more points S longitudinally spaced from each other, for increasing the number of measurement points.

Figure 5A:
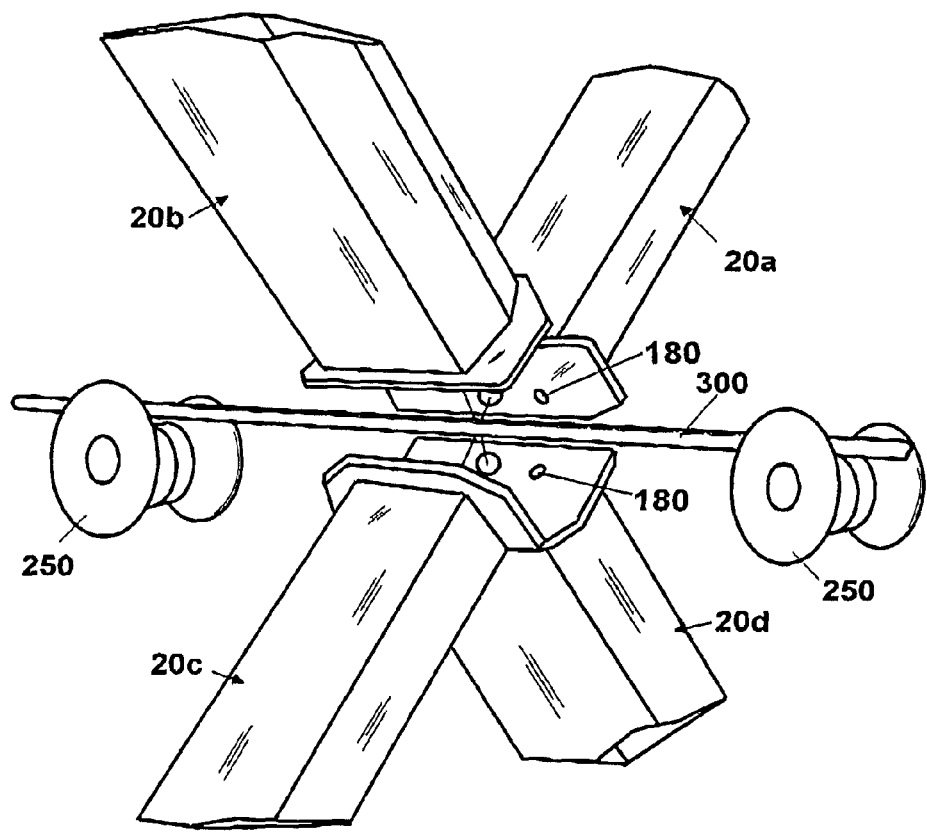
FIG. 5A shows a perspective view of the measurement apparatus for determining the thickness of FIG. 5, with several detection probes arranged on a line of continuous advancement of the glass tube.

Alternatively, or in combination, it is possible to obtain a multiplicity of measurement points in consecutive instants, exploiting the translational or rotational movement imposed to object 30 or to tube 300 by a conveying system or by the machines of the production line same, as shown in FIGS. 5A to 5C. This way, it is possible to control for example the thickness of an end of a vials in the pharmaceutical field, even after having filled it. More in particular, each detection probe has respective optical fibres, in particular four 25a, 25b, 25c and 25d that serve, as above described, for sending the exiting radiation 5 and to collect the exiting radiation 15, in order to obtain optical signals 27a, 27b, 27c and 27d. In particular, probes 20a, 20b, 20c and 20d are connected to central optical unit 200 by an optical multiplexer 70 so that, according to a time division operation, each probe, in turn, receives the radiation 5 to focus on tube 300, and provides the reflected radiation to analyse 27a, 27b, 27c and 27d to the means for analysis 50, running for a same optical path 29, for an appropriate time to obtain an enough accurate measurement. This way, it is possible to emit and analyse the signals coming from several probes generated by a single central optical unit with remarkable advantage on the costs of the apparatus. Furthermore, this solution is advantageous also concerning the use and, in particular, the adjustment of the instrument, since the result of the measure depends typically on the features of the source and by the spectral analyser, which are common to all the probes.

Such solution allows measuring the thickness of the walls of a tube 300 in a multiplicity of points, in particular four, different from each other. Respective output signals 55a, 55b, 55c and 55d can be obtained by the means for analysis 50 and computed through algorithm 60, in order to obtain corresponding thickness signals 65a, 65b, 65c and 65d.

Such configuration allows, furthermore, to compare to each other the values of the thicknesses s of the proximal portions 300a of each probe 20a, 20b, 20c and 20d for measuring a possible shape defect of the glass tube 300, due, for example, by non-concentricity between the inner wall 302 and the external wall 301. It results, in fact that, by measuring the thickness of the wall of the tube on at least three points rotationally spaced from each other about tube 300, it is possible to determine a possible shape defect, in particular of non-concentricity between the inner and external surface of the tube same. Increasing the number of measurement points along the circumference it is possible to increase the measurement precision and then the reliability of the following feedback control step of the production.

In a further exemplary embodiment of FIG. 6, each probe 20 is configured to measure the thickness of tube 300, in order to measure the thickness of tubular proximal portion 300a and of a tubular distal portion 300b opposite to tubular proximal portion 300a. In this case, entering light radiation 5 encounters a first time tubular wall 350 at tubular proximal portion 300a, in part crosses tubular proximal portion 300a and enters tubular recess 303 giving rise to a second exiting radiation 7'. Second exiting radiation 7' crosses recess 303 and encounters tubular distal portion 300b of wall 350, then hits a proximal interface 302a of tubular distal portion 300b, is in part reflected by the proximal interface 302a, in order to generate a reflected radiation and to cross at 13 in part the transparent material of the wall hitting upon a distal interface 302b of tubular distal portion 300b. Similarly, the radiation 13 is in part reflected by distal interface 302b, generating the radiation 14 that crosses again the transparent material of wall 350 hitting upon again the proximal interface 302a and crosses it generating a fourth reflected radiation 16.

The third 12 and fourth 16 reflected radiations cross again recess 303 and tubular proximal portion 300a generating a fifth 17 and sixth 18 reflected radiations that are overlapped to the first 6 and second 9 radiations. In the description further reflections which occur on the proximal interface 301a and distal interface 310b of the proximal wall are omitted, which occur with the same principle of the reflections described for object 30, in FIG. 2. In particular, the fifth 17 and sixth 18 reflected radiations derive from the radiations 12' and 16' that cross again the transparent material of tubular proximal portion 300a. In this case, the exiting light radiation 15' is obtained by an overlapping of the first 6 and second 9 reflected radiations, as well as of the fifth 17 and sixth 18 reflected radiations.

The means for analysing 50 is configured in this case to analyse with spectroscopic methods the exiting light radiation 15' for determining the thickness of tubular proximal portion 300a and of tubular distal portion 300b according to the features or mode of interference between the first 6, the second 9, the fifth 16 and sixth 17 reflected radiations. This way, it is possible to obtain the measurement of the thickness of more points under a same probes used.

In particular, by the presence of the second couple of reflected radiations 17 and 18, interfering to each other, the computing step of the thickness of the above described FIGS. 2C and 2D is changed as shown in FIGS. 7A and 7B.

The signal on optical path 27, processed by a spectrum analyser 46, generates a comb-like spectrum with beats 53' (FIG. 7A). The respective trend of intensity responsive to the frequency shows an alternation of peaks and valleys finely spaced from each other, with a profile of modulated amplitude (FIG. 7A). This is the result of overlapping two comb-like spectra with comparable widths and spacings $\Delta\lambda_0$ or $\Delta f$ slightly different from each other, owing respectively to the interference, to couples, between the first 6 and second 9, and the fifth 17 and sixth 18 reflected radiations, respectively corresponding to the thicknesses $s_1$ and $s_2$ of the tubular proximal portions 300a and distal 300b, according to the same above algorithms.

By a suitable numeric analysis, for example by means of Discrete Fourier Transform (DFT), it is possible to obtain a trend with time as depicted in FIG. 7B, which has two peaks 15a, 15a', whose abscissas represent, according to the same proportionalities as above defined, the thicknesses of the two portions, proximal 300a and distal 300b.

Since the height, or more in general the area, of the two peaks 15a and 15'a are responsive to the light intensity collected by reflection from the two tubular portions, proximal 300a and distal 300b, and to the rate of interference obtained for each couple of reflected radiation (6 and 9 for proximal, 17 and 18 for distal), it is possible to use this information for discriminate the thickness measurement $s_1$ and $s_2$ i.e. associating them correctly to the two tubular portions proximal 300a and distal 300b.

This way, by the choice of the focusing configuration, or of the adjustment of the distance between the lens and the object, it is possible to adjust the relative intensity and the quality of the interference of the reflected radiations 6 and 9 with respect to radiations 17 and 18, in order to obtain not only the thickness measurement $s_1$ and $s_2$ but also their correct association to the proximal portions 300a and distal 300b.

More in general, microprocessor 60 executes the algorithm of FIG. 2B, in order to check not only a single peak value but more than one, and to extract the measurements of both thicknesses $s_1$ and $s_2$, associating them correctly to the measured respective portions, using some input parameters 62, in this case comprising also the information of what portion has to be associated with the more intense interfering couple.

At the output from microprocessor 60, two values XX and YY are obtained, that can be shown on a display 80, which show the thicknesses $s_1$ and $s_2$ of the proximal wall 300a and distal wall 300b of transparent tube 300. This way, it is possible to measure the thickness s of the glass tube 300 in both the points of the tube that are located on the optical axis of the probe.

Figure 8A:
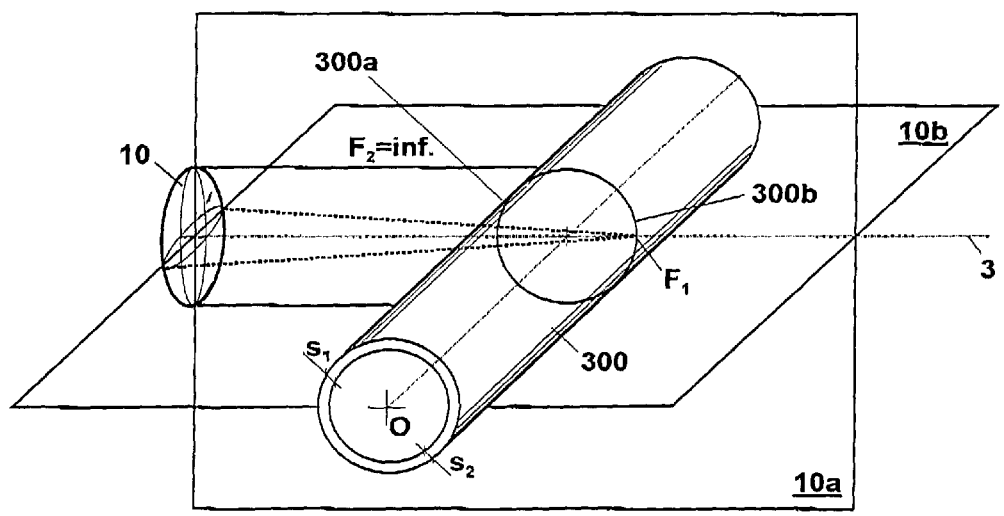
Figure 8B:
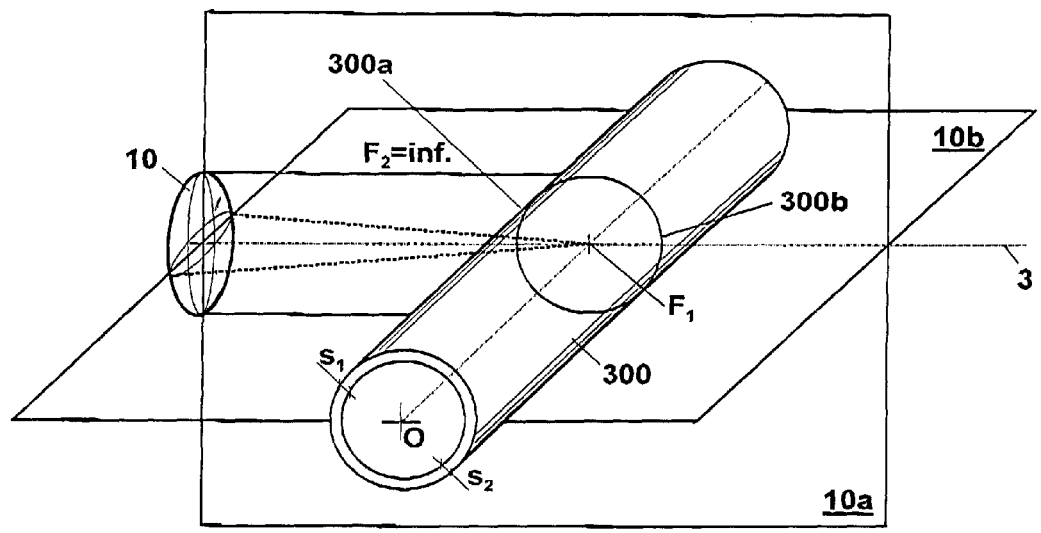
Figure 8C:
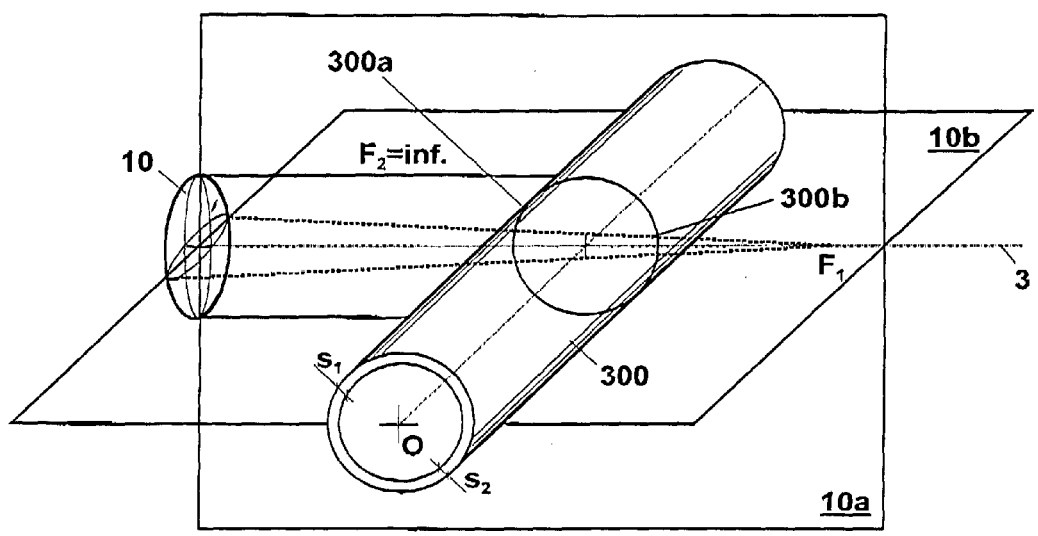
Figure 8D:
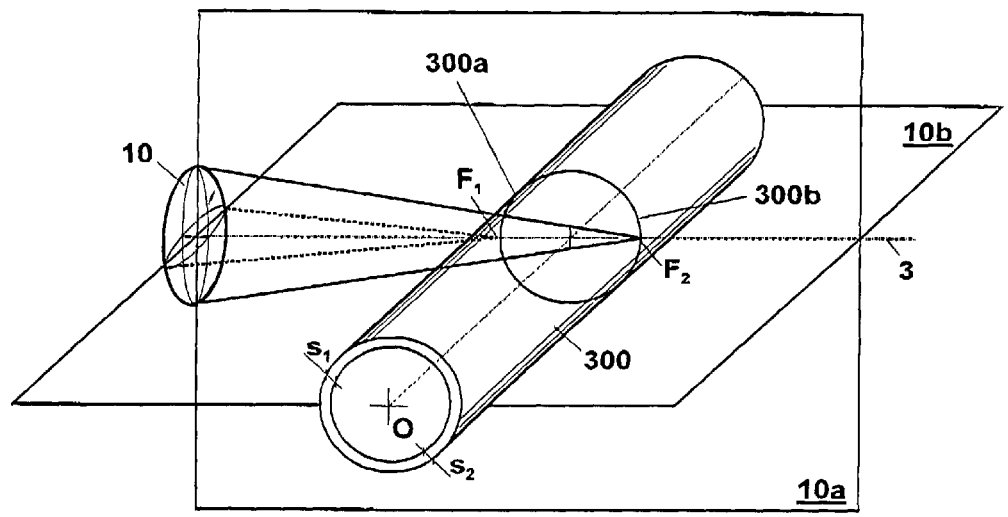
Figure 8E:
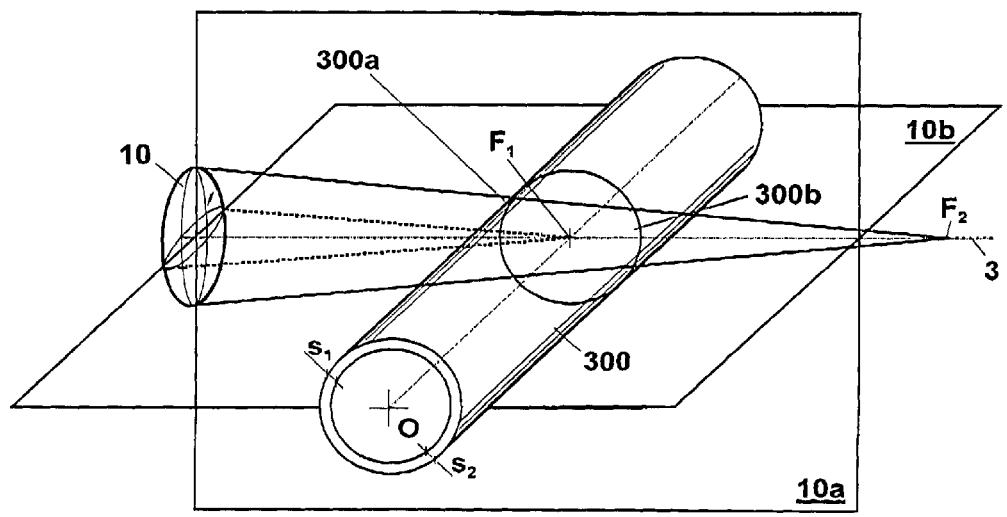
Figure 8F:
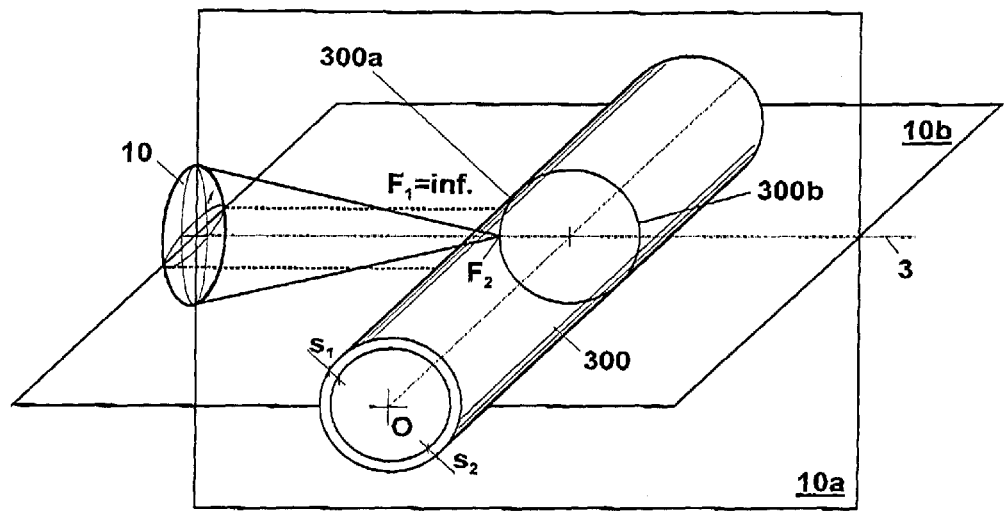
Figure 8G:
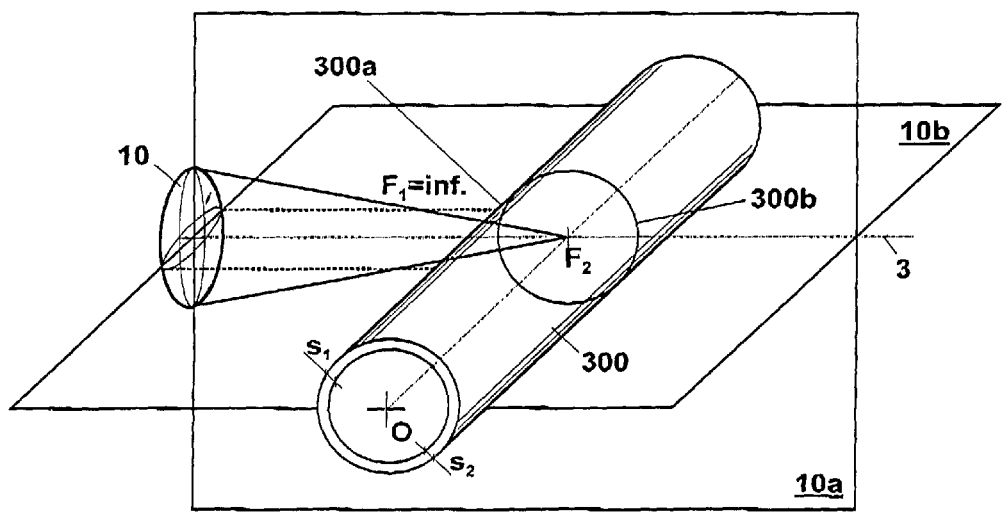
Figure 8H:
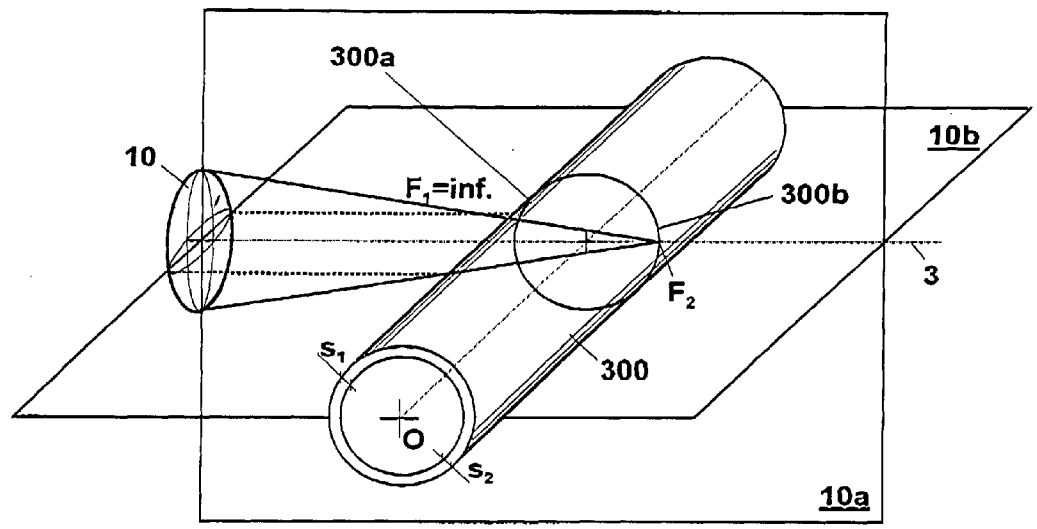
Figure 8I:
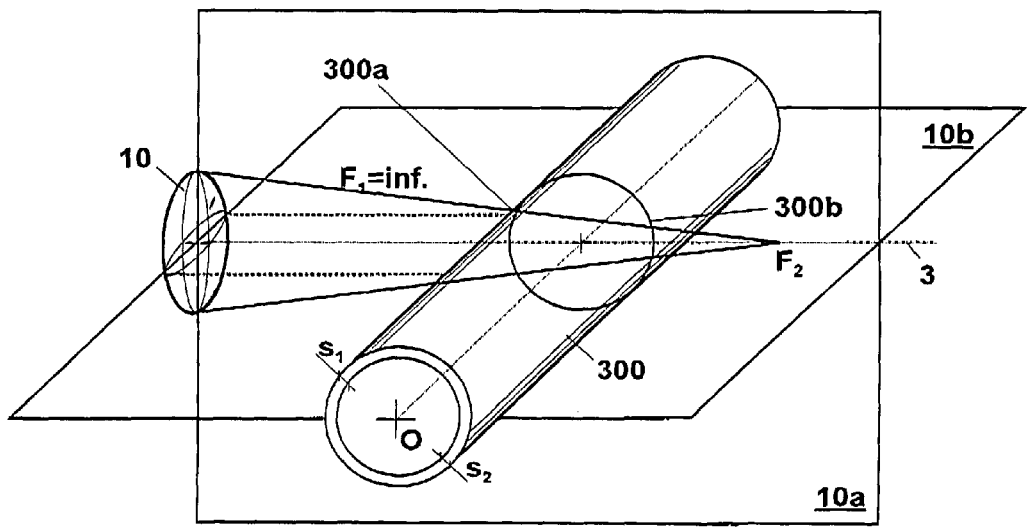

Also in this case, as shown in FIGS. 8 to 8I, the step of focusing provides different solutions, aiming to obtain appropriate intensity and quality of interference, not much influenced by the vibrations and/or misalignment of the tube, achieving a precision of the two thickness measurements, as well as capable of distinguishing among the two measurements, i.e. of associating them correctly to the correct portion of wall (proximal and distal).

Normally, to obtain a good efficiency of collecting the radiation reflected from both tubular portions, proximal portion 300a and distal portion 300b, it is useful considering focusing configurations which are confocal for reflection on both the surfaces of the tubular portions. In particular, to preserve robustness to misalignments and vibrations, different mono-optimal configurations are considered below, which can be obtained in different ways (focusing near the wall, or near the centre of curvature) on the two meridian planes 10a, 10b and for two tubular portions 300a, 300b.

For example, to obtain that the focus in a meridian plane vertical 10a is at tubular distal portion 300b, the incident radiation has to converge towards a point that is arranged between the axis of the tube O and tubular distal portion 300b, but before reaching it, since tubular proximal portion 300a works as diverging lens and therefore moves forward the effective focus.

In a first exemplary embodiment, first virtual focus $F_1$, which lays in a meridian horizontal plane 10b, is located substantially on tubular proximal portion 300a whereas second virtual focus $F_2$ lays in a vertical meridian plane 10a and is located substantially at the infinite. (FIG. 8). Such configuration is mono-optimal for measuring the thickness of the sole tubular proximal portion 300a.

In FIG. 8A a configuration is shown derived from that of FIG. 8, where the confocal reflection is obtained on tubular distal portion 300b, and also focusing on the wall, and on the same meridian horizontal plane. Such configuration is mono-optimal only for measuring the thickness of tubular distal portion 300b, and has a good robustness with respect to misalignments in a vertical plane In a derivation from configurations of FIGS. 8 and 8A, first virtual focus $F_1$ is brought at the axis O of tube 300, obtaining a configuration that is intermediate between configurations of FIGS. 8 and the 8A for the measurement of the thickness both of tubular proximal portion 300a and of tubular distal portion 300b. Such configuration, even if not optimal for any of the portions 300a and 300b, is however a good compromise, since it achieves an output signal of enough intensity for both the measurements of the proximal and distal thicknesses $s_1$ and $s_2$, and allows a good discrimination of the two measurements according to the relative intensity, by adjusting the position of the focus along the optical axis in tube 300.

A further exemplary embodiment of FIG. 8C, provides bringing the focus $F_1$ much farther beyond tubular distal portion 300b, in particular such that the exiting radiation 5 is collimated within tube 300. Such configuration approximates the condition of confocal reflection in a meridian horizontal plane 10b in the mode of focusing at the centre of curvature (which in case of the tube, in the horizontal plane is arranged at the infinite), which is mono-optimal for both the tubular portions, proximal 300a and distal 300b (see FIG. 8F and the following).

The configuration of FIG. 8D provides first virtual focus $F_1$ on tubular proximal portion 300a and a second virtual focus $F_2$ on tubular distal portion 300b. It is obtained, this way, a mono-optimality on both the walls, on two different meridian planes. This allows a higher robustness of the measurement of the proximal portion, and a good signal intensity on both.

A configuration similar to that of FIG. 8D (not shown), is obtained rotating 90° the lens about its optical axis, and has features in common to the previous case.

Another configuration, deriving from the configuration of FIG. 8D, that is configured to the measurement of both the proximal and the distal thicknesses of the tube, is shown in FIG. 8E and shows first virtual focus $F_1$ on the axis or the tube and second virtual focus $F_2$ beyond tubular distal portion 300b. This way, by adjusting the position of first virtual focus $F_1$ a good indication of the peaks of interference and selection of the signal of interference with respect to each other are obtained, as shown in FIG. 7B, whereas the adjustment of the focus $F_2$ determines the robustness to possible vibrations in the vertical plane, allowing an intensity gain if the vibrations are more reduced or a tube of larger diameter has to be measured. In particular, it is obtained that if the focus $F_2$ is located farthest, then the cone of return of the light is vertically wider and then the measure is less sensitive to the vibrations. Bringing $F_2$ at the infinite the configuration of FIG. 8A is obtained again.

The configurations of the Figs. from 8F to 8I show respective configurations with a first virtual focus $F_1$ substantially at the infinite, whereas the position of second virtual focus $F_2$ is at the proximal and distal portions, or at the optical axis within the tube, or even beyond the distal wall, obtaining configurations in any case at least mono-optimal in a meridian horizontal plane for both the measurements and in several case bi-optimal, for one or the other, or both the measurements.

Advantageously, the above described configurations are obtainable by an optical system with a fixed focus, i.e. without the need to using means for moving the lenses with respect to each other or with respect to the optical fibres, simply changing the distance of the object from the lens 10, in order to optimize the thickness measurement of tubular proximal portion 300a, of tubular distal portion 300b or of both portions, taking into account the amplitude of the vibrations of the object.

More in particular, the configurations of FIGS. 8F and 8H are confocal also in a meridian plane vertical 10a since focused respectively on tubular proximal portion 300a and on tubular distal portion 300b.

In the configuration 8G where second virtual focus $F_2$ is located at the axis O of the tube, there is a simultaneous reflection confocality for both meridian planes 10a, 10b on both the surfaces of tubular proximal portion 300a and of tubular distal portion 300b, such that this configuration can be considered bi-optimal two times. Then, this configuration shows also a maximum sensitivity to vibrations or misalignments and a less reliable discrimination of the two peaks.

Finally, in the configuration of FIG. 8I with the second virtual focus beyond tubular distal portion 300b, a good independence from the vibrations and robustness of the measurement is obtained maintaining a confocality in a meridian horizontal plane 10b.

In the above described focusing types, an optimality is obtained of the collected radiation, given by an overlapping of the first 6 and second 9, of the fifth 16 and sixth 17 reflected radiations, substantially independent from possible movements of tube 300, within a certain limit, and a good robustness of the signal for computing both thicknesses contemporaneously, as described. In fact, in case of symmetrical lens a good collection of the reflected radiation occurs only if the object or tube remains still, whereas if the object moves, for example owing to vibrations or fluctuations, as it can occur in case of continuous objects that move along a production line, or in case of a glass tube 300, the collected reflected radiation would be very reduced and not enough for following spectroscopic analysis.

This way, it is obtained that the collected radiation contains enough energy for determining, through the analysis of the spectrum (FIG. 7) both the thickness of tubular proximal portion 300a and of tubular distal portion 300b of tube 300 with a good rate of reliability and robustness of the measurement with respect to fluctuations and vibrations of the tube. In other words, with the double contemporaneous measurement of the thickness of tubular proximal portion 300a and on tubular distal portion 300b it is possible to reduce the number of measuring instruments of the thickness, or to double the number of measurement points with the same number of measuring instruments. In this case, the step of adjusting the position of the non-axisymmetric lens means 10 can adjust the position of the first and second virtual focus, in order to optimize the interference characteristics between the first, second, fifth and sixth reflected radiations and the fraction of energy collected by them. More in particular, the adjustment of the position allows showing the peaks of interference 15a and 15a', and of selecting the interference signals relative to tubular proximal portion 300a and to tubular distal portion 300b, and of distinguishing them from each other. In other words, an adjustment is obtained that tends to show the interference signals of the first and second reflected radiations, i.e.

peak value 15a, and of the fifth and sixth reflected radiations, peak value 15a'. Advantageously, lens 10 is moved using feedback information in such a way that it is configured to control the comb-like spectrum 53 and to ensure a predetermined intensity of both the peaks (and in particular of the lower peak value 15a', for example relative to tubular distal portion 300b), and a difference of intensity between the peaks 15a and 15a', which can be responsive to the intensity of the higher peak values 15a.

Figure 9:
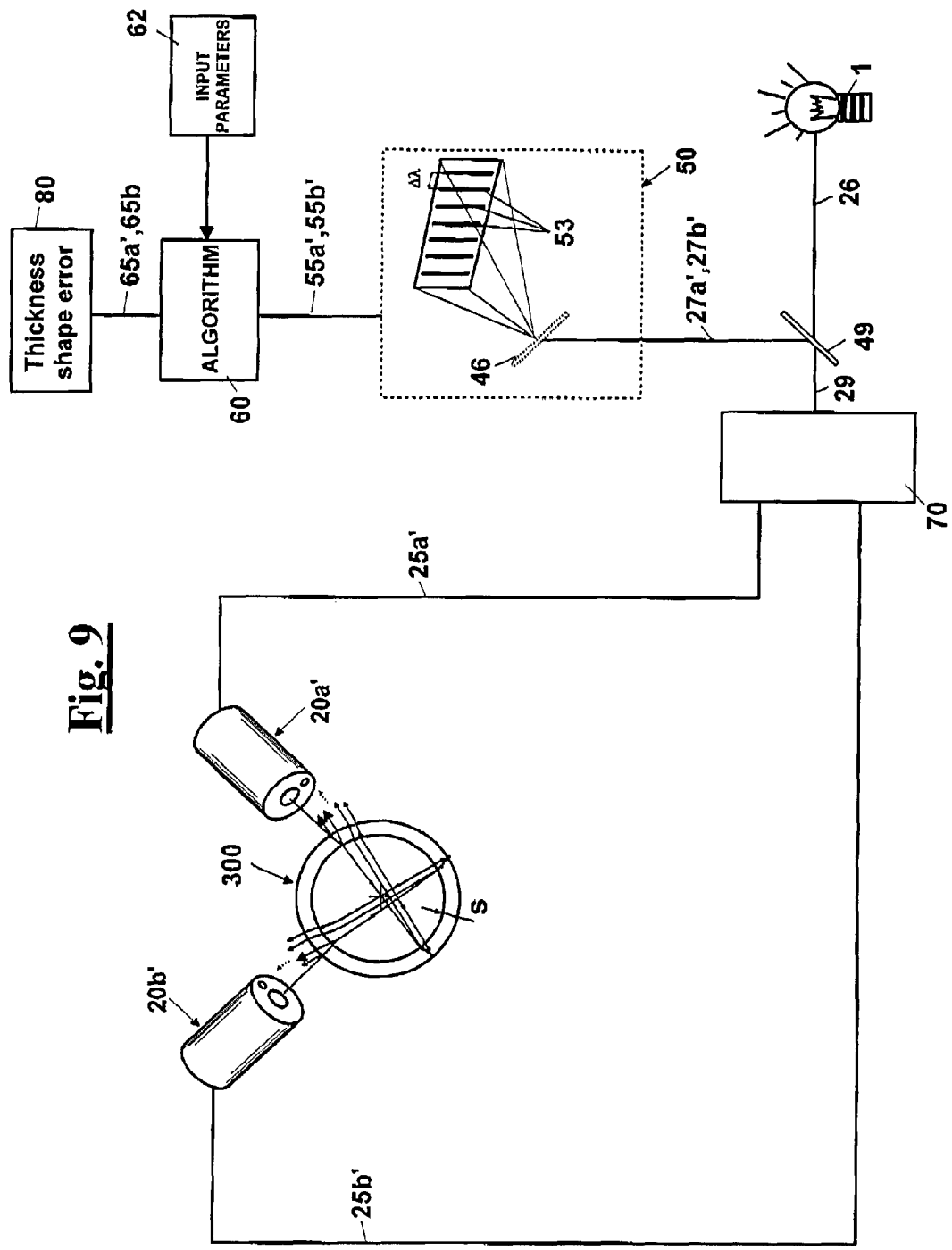
FIG. 9 shows a diagrammatical view of an exemplary embodiment of the measurement apparatus for determining the thickness of FIG. 7, which comprises two optical detection probes that measure each both the proximal and distal thicknesses, in order to determine the thickness of the glass tube in four different points, the reflections on each wall are simplified.

A possible exemplary embodiment of the apparatus that allows measuring the thickness of tubular proximal wall 300a and of proximal wall end 300b contemporaneously, is shown in FIG. 9. In this case, each probe 20a', 20b' is configured to measure the thickness of tube 300 on both the walls that face a respective probe reaching a number of measurement points similar to that of FIG. 5, but adopting a lower number of probes. This way, under a same number of probes arranged about tube 300 and owing to the possible multiplicity of measurement points obtained by moving the probes with respect to the tube, a further doubling is obtained of the number of measurements. It follows an additional saving in the production of the measurement apparatus. More in particular, each detection probe 20a', 20b' has a respective single-mode optical fibre 25a', 25b' connected to the multiplexer 70 that is connected to the central optical unit 200, according to a time division operation, so that each probe, in turn, receives the radiation 5 to focus on tube 300, and provides the reflected radiation to analyse 27a', 27b', containing each four reflected components that pass through the means for analysing 50 and generate the signals 55'a and 55'b that are supplied as input to algorithm 60 that analyses them in combination with the input parameters 62 to generate the signals 65'a and 65'b that contain the thickness of the wall in more points and then the shape defects of the tube.

The apparatus 100 according to the invention may comprise, furthermore, as diagrammatically shown in FIG. 10, program control means 150 for a control of the production associated with the means for analysis 50, such that on the basis of detected thickness values, the production control means 150 acts and operates the object shaping means 170, in particular the glass tube shaping means. This way, it is possible to adjust the shaping step of the glass tube according to the shift from a predetermined ideal thickness.

More in particular, on the basis of value s of the thickness detected by the probes spaced about tube 300 and on the basis of an ideal reference value of air bubbles equal to zero, the control program means 150 acts and controls the shaping means 170 of the glass tube 300 (FIG. 11). In detail, the control means 150 is configured to analyse and correlate the thicknesses determined by the probes 20a, 20b, 20c and 20d, according to the configuration with four probes of FIG. 5, or by the two probes 20'a and 20'b, in the configuration of FIG. 9, for said plurality of points, rotationally and/or longitudinally spaced about tube 300, and in the presence of thickness errors or shape defects of the tube it controls the glass shaping process accordingly.

In particular, as shown in FIGS. 11 and 11A, in case of making continuous glass tubes through a casting orifice 175 at which a tube shaping element is arranged, the control means uses the thickness information as feedback for correcting the position of the forming element 177 according to a Cartesian reference system. This way, it is possible to optimize the production of the glass tubes to minimize wastes of production.

In another application, an accurate mapping with more points in a circumferential direction of the tube that allows determining a possible shape defect, can be used, for example, for phasing rotationally shape defects in case the ends of two tubes or portions of tube are coupled frontally to each other. This way, by knowing the shape of each end of the tubes to couple it is possible to orient such ends, rotating one of the two portions of tube about its own axis, in order to obtain an optimal matching that can be, for example, carried out engaging, welding or gluing the ends.

In particular, in the same application, it is possible to use the reading distance supplied by the sensor 180 to obtain, in addition to the profile of thickness also the roundness profile, at the same time.

The foregoing description of specific exemplary embodiments of the invention will so fully reveal the invention from a conceptual viewpoint so that other, by applying current knowledge, will be able to modify and/or adapt in various applications this specific exemplary embodiment without further research and without parting from the invention, and, then it is meant that such adaptations and modifications will have to be considered as equivalent to the specific exemplary embodiments. The means and the materials to realise the different functions described herein could have a different nature without, for this reason, departing from the field of the invention. It is to be understood that the phraseology or terminology that is employed herein is for the purpose of description and not of limitation.

p.p. GERRESHEIMER PISA S.p.A.

The invention claimed is:

1. A method for measuring the thickness of a wall (35) of a transparent object (30), in particular a curved object, said wall (35) comprising: a transparent material (35a), a proximal interface (31) arranged between an external environment (33) and said transparent material (35a), and a distal interface (32) arranged between said transparent material (35a) and said environment (33) opposite to said proximal interface (31), said method providing the steps of:

prearranging a starting light radiation (2);

focusing (10,11,22,23) said starting light radiation (2) obtaining an entering light radiation (5) directed towards said wall (35) so that said entering light radiation (5):
hits said proximal interface (31) of said wall (35),
is in part reflected by said proximal interface (31), in order to is generate a first reflected radiation (6),
crosses (7) in part said transparent material (35a) hitting upon said distal interface (32) and is in part reflected (8) from said distal interface (32);
crosses in part in an opposite direction, after the reflection on said distal interface (32), said transparent material (35a) hitting upon again and crossing said proximal interface (31), in order to generate a second reflected radiation (9);

collecting (40) an overall exiting light radiation (15) an overlapping of said first (6) and second (9) reflected radiations;

analysing (50) said exiting light radiation (15) with spectroscopic methods and for determining the thickness (s) of said wall (35) according to interference characteristics between said first (6) and second (9) reflected radiations in said exiting light radiation (15), characterised in that said step of focusing (10) provides obtaining said entering light radiation (5) through a non-axisymmetric lens means (10,11,22,23) having two main meridian planes (10a, 10b) such that said entering light radiation (5) is focused on a first virtual focus ($F_1$) in a first main meridian plane (10a), and on a second virtual focus ($F_2$) in a second main meridian plane (10b).

2. A method, according to claim 1, wherein said step of focusing provides one among the following focusing conditions:
- said first ($F_1$)/second ($F_2$) virtual focus is located at a finite position beyond said wall (35) and said second ($F_2$)/first ($F_1$) virtual focus is located substantially at said wall (35);
- said first ($F_1$)/second ($F_2$) virtual focus is located substantially at the infinite and said second ($F_2$)/first ($F_1$) virtual focus is located substantially at said wall (35);
- said first ($F_1$)/second ($F_2$) virtual focus is located substantially at the infinite and said second ($F_2$)/first ($F_1$) virtual focus is located at a finite position beyond said wall (35).

3. A method, according to claim 1, wherein said step of collecting provides a step of focusing said overall exiting light radiation (15), such that the exiting light radiation (15) received has enough energy to allow determination, by said step of analysing, of the thickness (s) of said wall (35), in particular said step of collecting is effected by said non-axisymmetric lens means (10,11,22,23) that are hit by said exiting light radiation (15) in a direction which is opposite to said starting light radiation (2); in particular said step of focusing provides a step of adjusting the position of said non-axisymmetric lens means (10,11,22,23) for adjusting the position of said first ($F_1$) and second virtual focus ($F_2$) to obtain a predetermined focusing condition.

4. A method, according to claim 1, wherein said thickness (s) is determined throughout a shaping step of said object, and a control step is provided of the shaping step of said transparent object (30) associated with said step of analysing, such that, on the basis of detected value of the thickness (s), said production control step controls shaping parameters of said object, in particular said object is a glass tube, wherein a step of correcting the glass shaping process of the glass tube can be provided according to a shift of the thickness (s) higher than a predetermined value, or in case shape defects are present, in particular said production control step of said transparent object (30) which is associated with said step of analysing controls and correlates to each other the thicknesses as determined for a plurality of points, which are rotationally and/or longitudinally spaced about said tube, and in the presence of thickness errors (s) or shape defects of the tube, adjusts the glass shaping process accordingly.

5. A method, according to claim 1, wherein said transparent object is a tube (300) having a tubular wall (350), in particular cylindrical, comprising a side surface (301) and an inner surface (302) that defines a tubular recess (303) with a longitudinal axis (0) and said entering light radiation (5) encounters a first time said tubular wall (350) at a tubular proximal portion (300a), in part crosses said tubular proximal portion (300a) of said tubular wall (350) and enters said tubular recess (303) creating a second exiting radiation (7'), said second exiting radiation (7') crosses the tubular recess (303) and encounters a tubular distal portion (300b) of said wall (350), and is focused in such a way that:
- hits a proximal interface (302a) of said tubular distal portion (300b),
- is in part reflected by said proximal interface (302a) of said tubular distal portion (300b), in order to generate a third reflected radiation (12),
- crosses in part said transparent material (35a) of said tubular wall (350) hitting upon a distal interface (32) of said tubular distal portion (300b) and is in part reflected by said distal interface (302b);
- crosses again said transparent material (35a) of said tubular wall (350) hitting upon said proximal interface (302a) and crosses said proximal interface (302a) generating a fourth reflected radiation (16);

said third (12) and fourth (16) reflected radiations cross said tubular recess (303) and said tubular proximal portion (300a) generating a fifth (17) and sixth (18) reflected radiation that are overlapped to said first (6) and second (9) reflected radiations, so that said overall exiting light radiation (15') is obtained by an overlapping of said first (6) and second (9) reflected radiations, as well as of said fifth (17) and sixth (18) reflected radiations, and said step of analysing (50) said overall exiting light radiation (15') with spectroscopic methods is configured to determine both the thicknesses ($s_1$, $s_2$) of said tubular proximal portion (300a) and of said tubular distal portion (300b) of said tubular wall (350) according to interference characteristics between said first (6), second (9), fifth (17) and sixth (18) reflected radiations.

6. A method, according to claim 5, wherein said step of focusing provides one among the following conditions:
- said first ($F_1$)/second ($F_2$) virtual focus is located substantially on said tubular proximal portion (300a) and said second ($F_2$)/first ($F_1$) virtual focus is located beyond said tubular distal portion (300b), and, in particular, substantially at the infinite;
- said first ($F_1$)/second ($F_2$) virtual focus is located within said tube i.e. beyond said tubular proximal portion (300a) and before said axis (O), and said second ($F_2$)/first ($F_1$) virtual focus is located beyond said tubular distal portion (300b), and, in particular, substantially at the infinite;
- said first ($F_1$)/second ($F_2$) virtual focus is located within said tube i.e. beyond said tubular proximal portion (300a) and at said axis (O), and said second ($F_2$)/first ($F_1$) virtual focus is located beyond said tubular distal portion (300b), and, in particular, substantially at the infinite;
- said first ($F_1$)/second ($F_2$) virtual focus is located within said tube beyond said axis, and said second ($F_2$)/first ($F_1$) virtual focus is located beyond said tubular distal portion (300b), and, in particular, substantially at the infinite;
- said first ($F_1$)/second ($F_2$) virtual focus is located substantially on said tubular distal portion (300b) and said second ($F_2$)/first ($F_1$) virtual focus is located beyond said tubular distal portion (300b), and, in particular, substantially at the infinite;
- said first ($F_1$)/second ($F_2$) virtual focus is located beyond said tubular distal portion (300b) and said second ($F_2$)/first ($F_1$) virtual focus is located beyond said tubular distal portion (300b), and, in particular, substantially at the infinite;
- said first ($F_1$)/second ($F_2$) virtual focus is located substantially on said tubular proximal portion (300a) and said second ($F_2$)/first ($F_1$) virtual focus is located substantially on said tubular distal portion (300b).

7. An apparatus (100) measuring the thickness (s) of a wall (35) of a transparent object (30), in particular a curved object, said wall (35) comprising: a transparent material (35a), a proximal interface (31) arranged between the environment (33) and said transparent material (35a), and a distal interface (32) arranged between said transparent material (35a) and said environment (33) opposite to said proximal interface (31),
said apparatus (100) comprising:
a means for emitting (1) a starting light radiation (2);

a means for focusing (10,11,22,23) said starting light radiation (2) that is configured to obtain an entering light radiation (5) directed towards said wall (35) so that said entering light radiation (5):
- hits said proximal interface (31) of said wall (35),
- is in part reflected by said proximal interface (31), in order to generate a first reflected radiation (6),
- crosses in part said transparent material (35*a*) hitting upon said distal interface (32) and is in part reflected by said distal interface (32);
- crosses in part in an opposite direction, after the reflection on said distal interface (32) said transparent material (35*a*), hitting upon again and crossing said proximal interface (31), in order to generate a second reflected radiation (9);

a collection means (40) an overall exiting light radiation (15) an overlapping of said first (6) and second (9) reflected radiations;

a means for analysing (50) said exiting light radiation (15) with spectroscopic methods and for calculating the thickness (s) of said wall (35) according to interference characteristics between said first (6) and second (9) reflected radiations, characterised in that said means for focusing comprises a non-axisymmetric lens means (10,11,22,23) for obtaining said entering light radiation (5), said non-axisymmetric lens means (10,11,22,23) having two main meridians (10*a*, 10*b*) such that said entering light radiation (5) is focused on a first virtual focus ($F_1$) defined by a first meridian plane (10*a*) and by the starting light radiation (2), and on a second virtual focus ($F_2$) defined by the second meridian plane (10*b*) and by the starting light radiation (2).

8. An apparatus (100), according to claim 7, wherein said means for focusing (10) and said collection means (40) the radiation are integrated in a detection probe (20) equipped with at least one single-mode optical fibre connector (21), in particular said detection probe (20) comprises a means for detecting the distance (180) between said means for focusing (10) and said object (30), in particular between said detection probe (20) and said object (30), said means for detecting the distance (180) being associated with said position adjustment means (90).

9. An apparatus (100), according to claim 8, wherein said transparent object is a tube (300) having a tubular proximal portion (300*a*) and a tubular distal portion (300*b*), wherein a plurality of detection probes (20*a*, 20*b*, 20*c*, 20*d*) is provided that is configured to measure a plurality of different points, in order to measure for each of said points the thickness (s) of the respective tubular proximal portion (300*a*), in particular said plurality of points are selected from the group consisting of: points rotationally spaced from each other about said tube (300) or points longitudinally spaced from each other along said tube (300) or a combination thereof, or an adjustment means is provided for adjusting the relative position, rotationally and, or longitudinally, of said tube (300) with respect to said detection probe (20) or to said plurality of detection probes (20*a*, 20*b*, 20*c*, 20*d*), to obtain the thickness measurement (s) in a plurality of different measurement points.

10. An apparatus (100), according to claim 9, wherein said plurality of detection probes (20*a*, 20*b*, 20*c*, 20*d*) is connected to a central optical unit (200) by an optical multiplexer (70) so that, according to a time division operation, each detection probe (20*a*, 20*b*, 20*c*, 20*d*), in turn, receives the radiation to focus on the sample, and provides the reflected radiation to analyse, for a predetermined time.

* * * * *